WORK HANDLING APPARATUS
Filed March 30, 1959 21 Sheets-Sheet 1
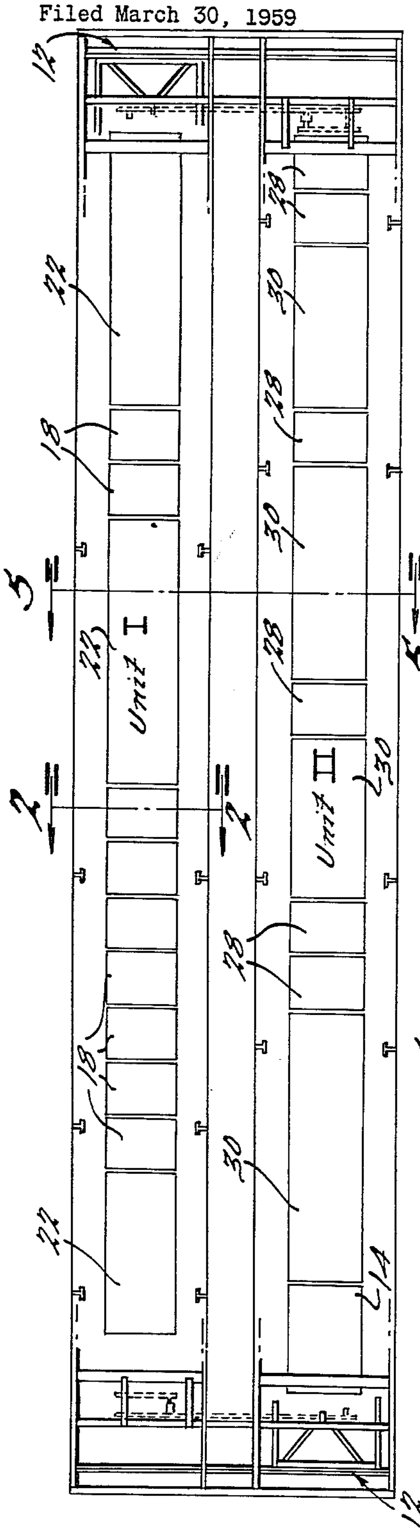
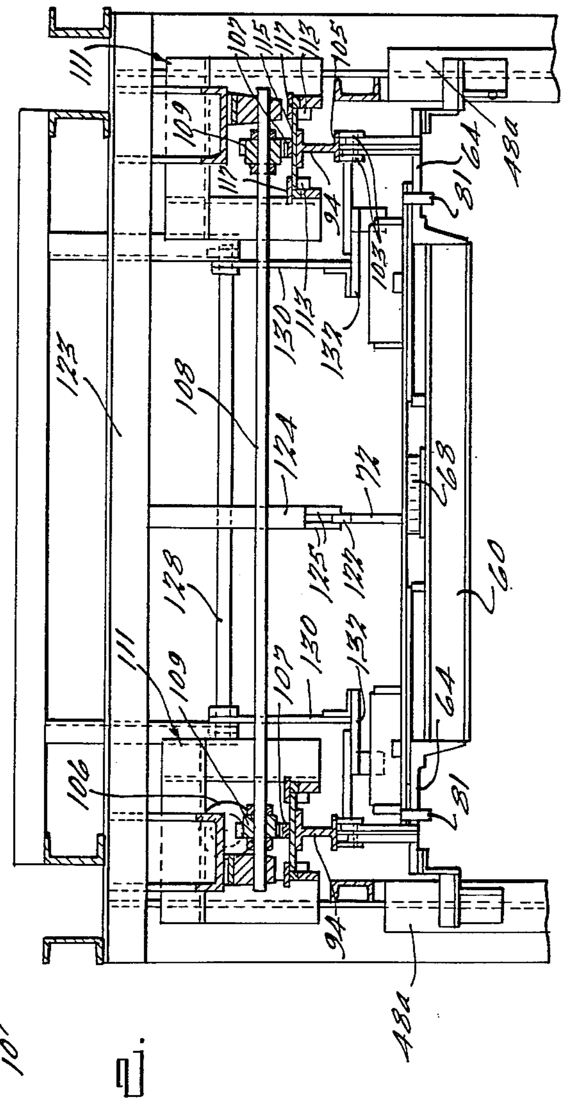
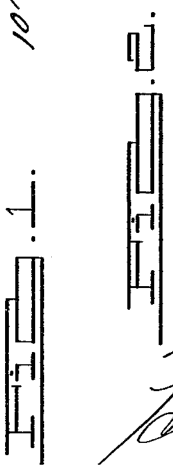
INVENTORS.
John V. Davis
Leon J. Pianowski.
BY
Harness, Dickey & Pierce.
ATTORNEYS.

INVENTORS.
John V. Davis
Leon J. Pianowski
BY
Harness, Dickey + Pierce.
ATTORNEYS.

INVENTORS.
John V. Davis
Leon J. Pianowski.
BY
Harness, Dickey & Pierce.
ATTORNEYS.

INVENTORS.
John V. Davis.
Leon J. Pianowski.
BY
Harness, Dickey & Pierce.
ATTORNEYS.

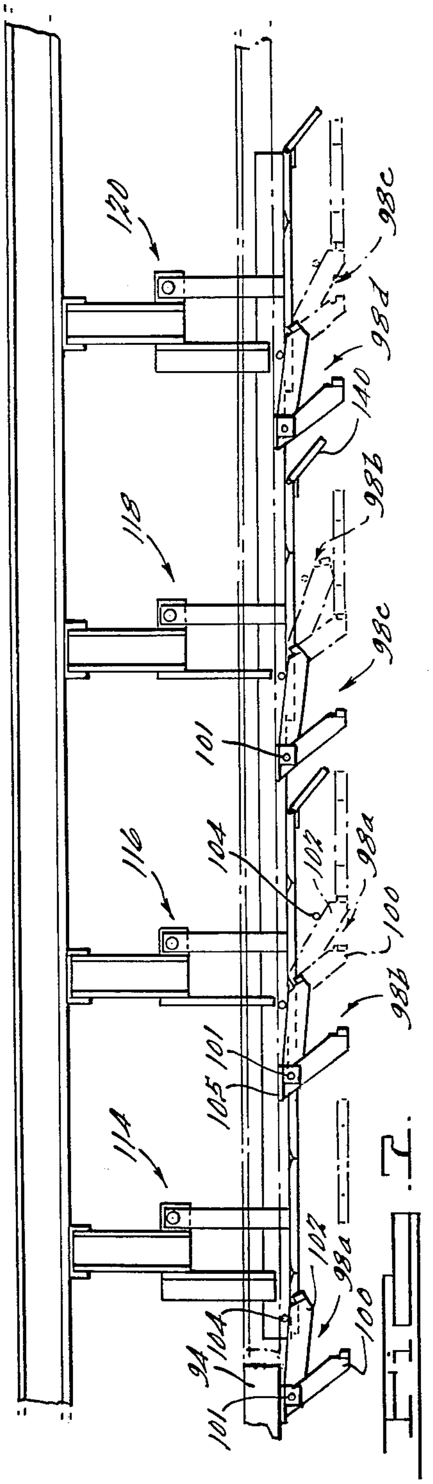
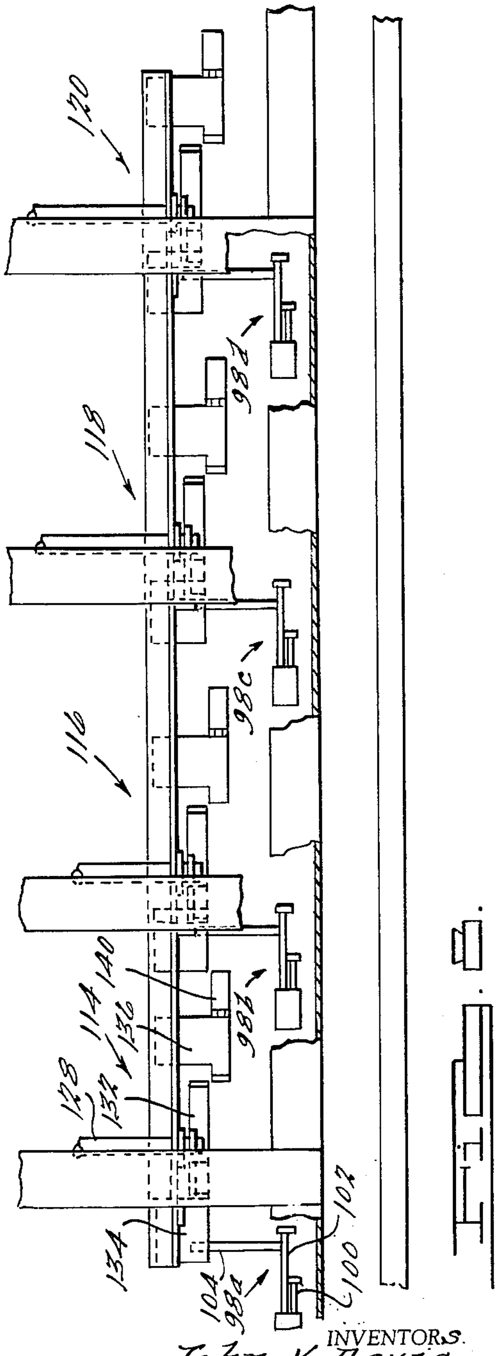
INVENTORS
John V. Davis
Leon J. Pianowski
BY
Harness, Dickey & Pierce
ATTORNEYS

WORK HANDLING APPARATUS

INVENTORS.
John V. Davis
Leon J. Pianowski
BY
Harness, Dickey & Pierce
ATTORNEYS.

INVENTORS.
John V. Davis
Leon J. Pianowski.
BY
Harness, Dickey + Pierce
ATTORNEYS.

WORK HANDLING APPARATUS

INVENTORS.
John V. Davis.
Leon J. Pianowski,
BY
Harness, Dickey & Pierce.
ATTORNEYS.

INVENTORS.
John V. Davis
Leon J. Pianowski
BY
Harness, Dickey & Pierce
ATTORNEYS.

INVENTORS.
John V. Davis
Leon J. Pianowski
BY
Harness, Dickey & Pierce
ATTORNEYS.

Jan. 22, 1963 J. V. DAVIS ETAL 3,074,418
WORK HANDLING APPARATUS
Filed March 30, 1959 21 Sheets-Sheet 11
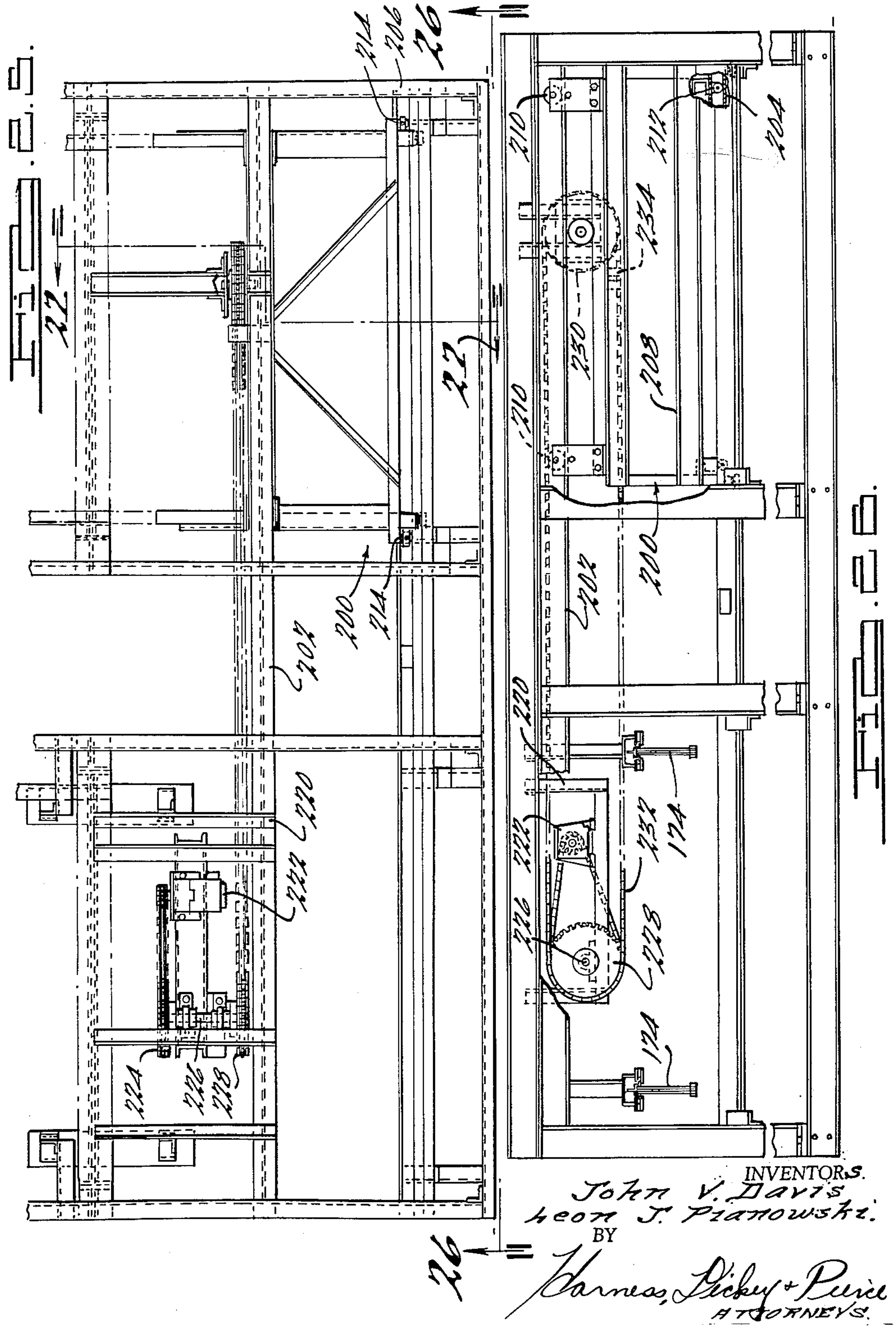
INVENTORS.
John V. Davis
Leon J. Pianowski
BY
Harness, Dickey & Pierce
ATTORNEYS.

Jan. 22, 1963 J. V. DAVIS ETAL 3,074,418

WORK HANDLING APPARATUS

Filed March 30, 1959 21 Sheets-Sheet 12

INVENTORS.
John V. Davis.
Leon J. Pianowski.
BY
Harness, Dickey & Pierce
ATTORNEYS INVENTORS.
John V. Davis.
Leon J. Pianowski.
BY
Harness, Dickey & Pierce.
ATTORNEYS.

INVENTORS.
John V. Davis,
Leon J. Pianowski.
BY
Harness, Dickey & Pierce
ATTORNEYS.

INVENTORS.
John V. Davis.
Leon J. Pianowski.
BY
Harness, Dickey & Pierce.
ATTORNEYS.

INVENTORS
John V. Davis,
Leon J. Pianowski.
BY
Harness, Dickey + Pierce
ATTORNEYS INVENTORS.
John V. Davis.
Leon J. Pianowski.
BY
Harness, Dickey & Pierce
ATTORNEYS.

INVENTORS.
John V. Davis
Leon J. Pianowski
BY
Harness, Dickey & Pierce
ATTORNEYS.

INVENTORS.
John V. Davis
Leon J. Pianowski.
BY
Harness, Dickey & Pierce.
ATTORNEYS.

Jan. 22, 1963 J. V. DAVIS ETAL 3,074,418

WORK HANDLING APPARATUS

Filed March 30, 1959 21 Sheets-Sheet 20

INVENTORS.
John V. Davis.
Leon J. Pianowski.
BY
Harness, Dickey + Pierce
ATTORNEYS.

INVENTORS.
John V. Davis.
Leon J. Pianowski.
BY
Harness, Dickey & Pierce.
ATTORNEYS.

3,074,418
WORK HANDLING APPARATUS

John V. Davis, Grosse Pointe Farms, and Leon J. Pianowski, Van Dyke, Mich., assignors to The Udylite Corporation, Detroit, Mich., a corporation of Delaware
Filed Mar. 30, 1959, Ser. No. 802,797
24 Claims. (Cl. 134—76)

This invention relates to work handling apparatus for moving workpieces through a predetermined cycle in a metal treating process.

Work handling machines of the type to which this invention relates, namely, the straight line type illustrated in United States Patent No. 2,484,079, are used for plating, anodizing, phosphating and the like processes for moving workpieces into and out of the different treatment tanks used in the processes. Since these machines are extremely large and expensive, the ultimate objective in all machines is to make the machine as flexible as possible so that it can be used in as many different processes and operations as possible. In such a machine, the objective is to make the cycle for each workpiece carrier variable and determinable by some selecting structure on the carrier so that when the carrier is introduced into the machine, the treatment cycle for workpieces on that carrier is determined.

The principal object of this invention, therefore, is to provide a flexible work handling machine of the above type.

A further object of this invention is to provide a work carrier in a machine of the above type which is readily adapted to different treatment cycles.

A further object of this invention is to provide a machine of the above type with improved mechanism for advancing work carriers through the machine.

Another object of this invention is to provide a machine of the above type which is simple in construction, economical to manufacture, and efficient in operation in moving work carriers through predetermined work cycles.

Further objects, features and advantages of this invention will become apparent from a consideration of the following description, the appended claims and the accompanying drawing in which:

FIGURE 1 is a diagrammatic plan view of the machine of this invention, illustrated as consisting of two side by side units designated as units I and II;

FIG. 2 is an enlarged fragmentary sectional view looking along the line 2—2 in FIG. 1;

FIG. 6 is a fragmentary side elevational view of a portion of unit I with the vertically movable chassis removed;

FIG. 7 is a fragmentary side elevational view of the indexing and station selector mechanism on a portion of the upper track for unit I showing moved positions of pusher dog units in dotted lines;

FIG. 8 is a top plan view of the structure shown in FIG. 7 with some parts broken away for the purpose of clarity;

Figures 9, 10, 11, 12, 13, 13A:
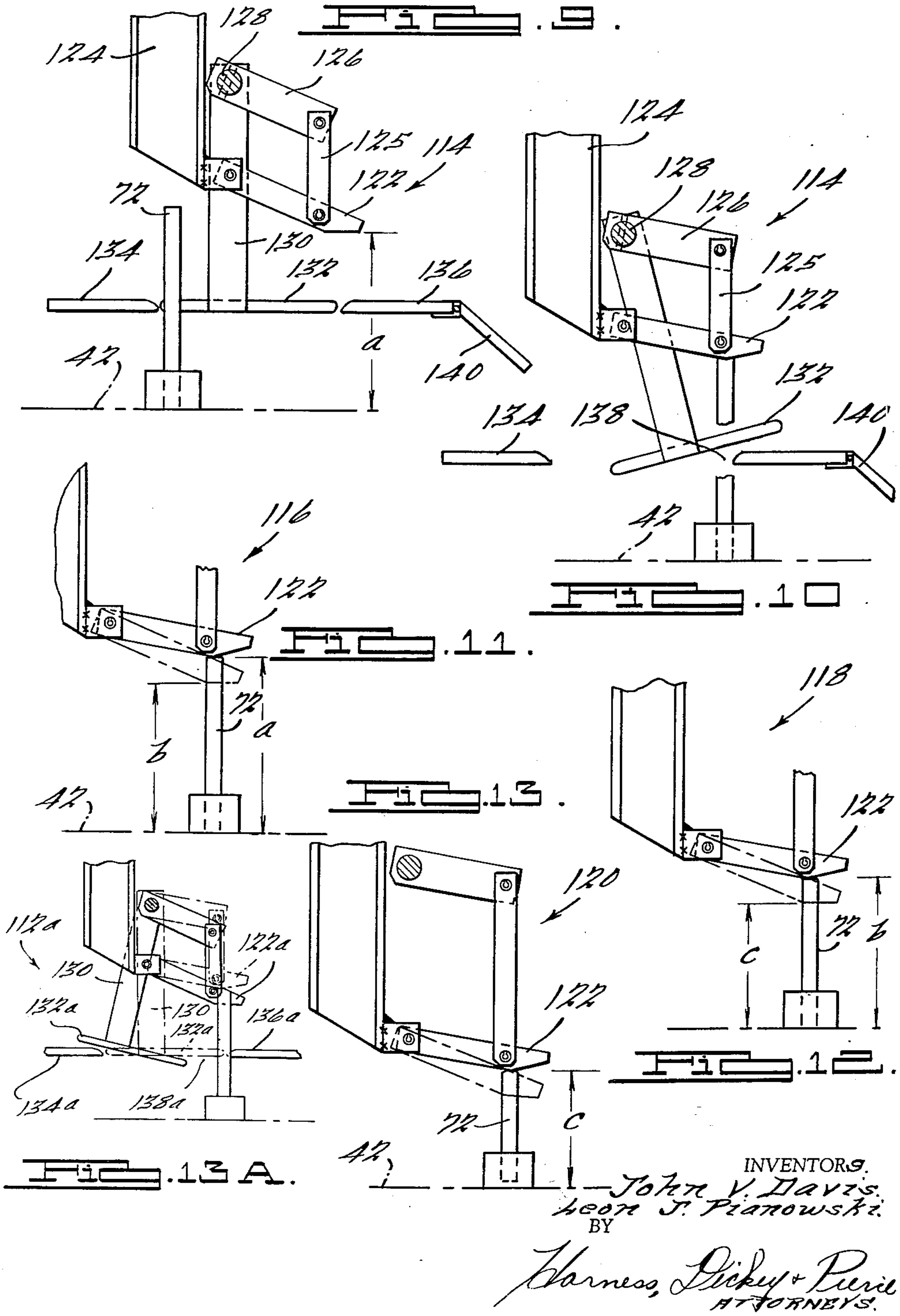
Figure 14:
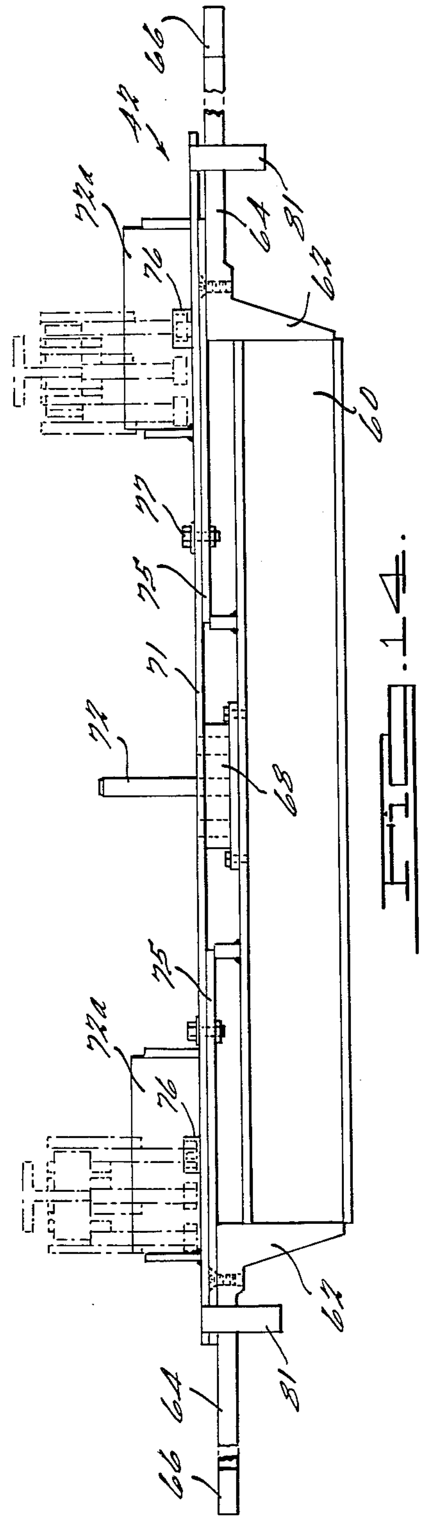
Figure 15:
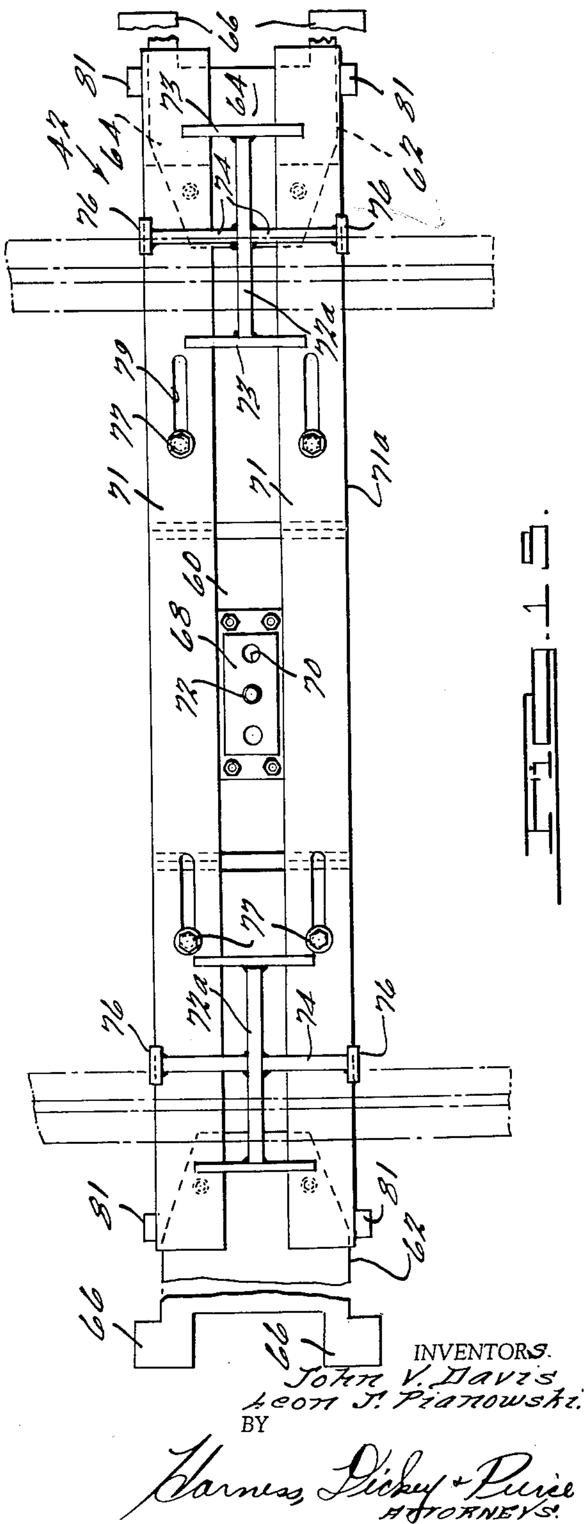
Figure 16:
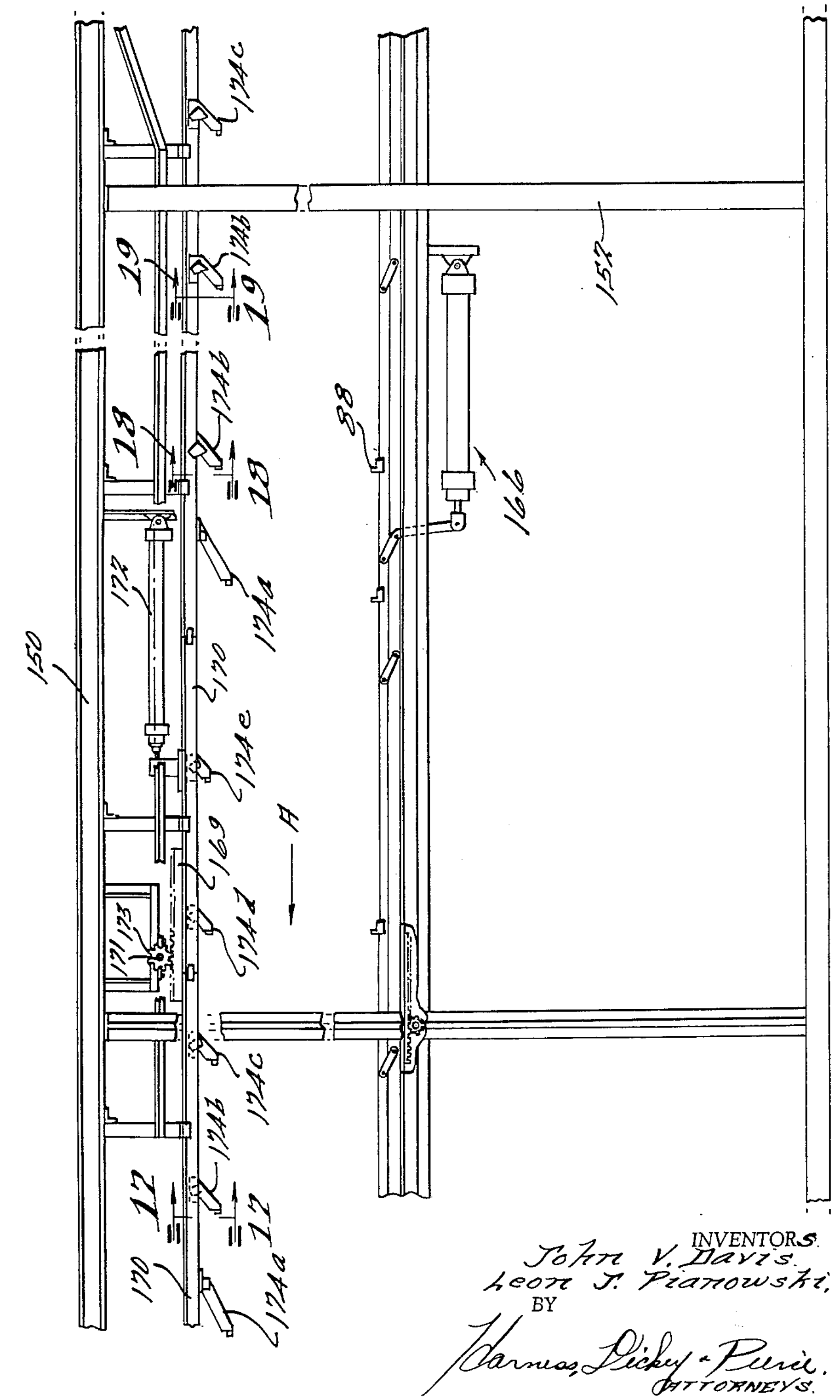
Figure 17:
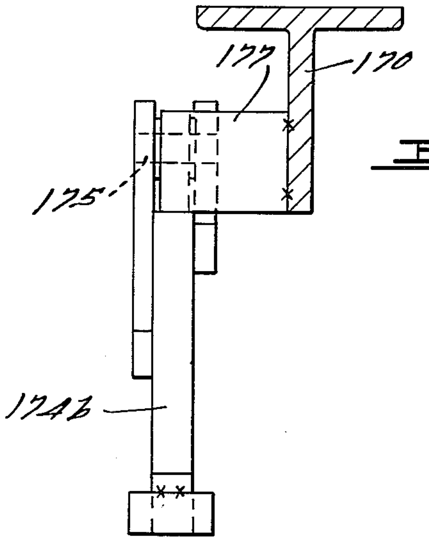
Figure 18:
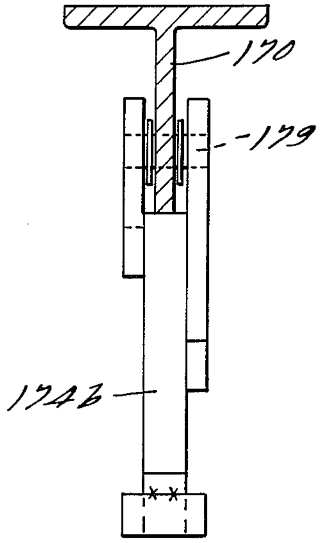
Figure 19:
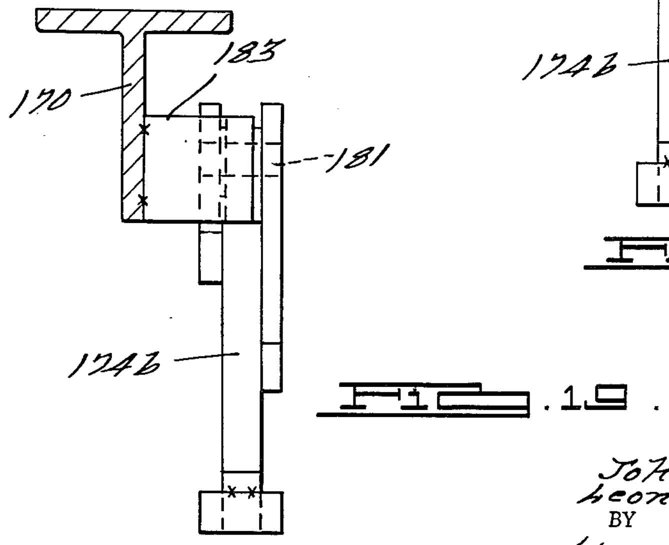
Figure 20:
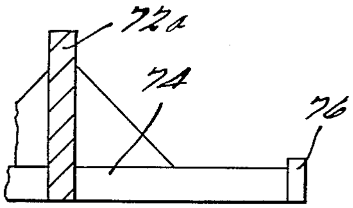
Figure 21:
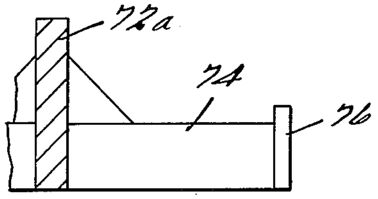
Figure 22:
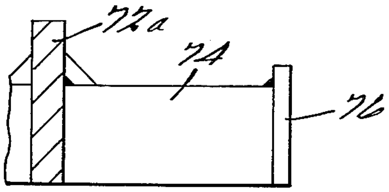
Figures 24, 24A:
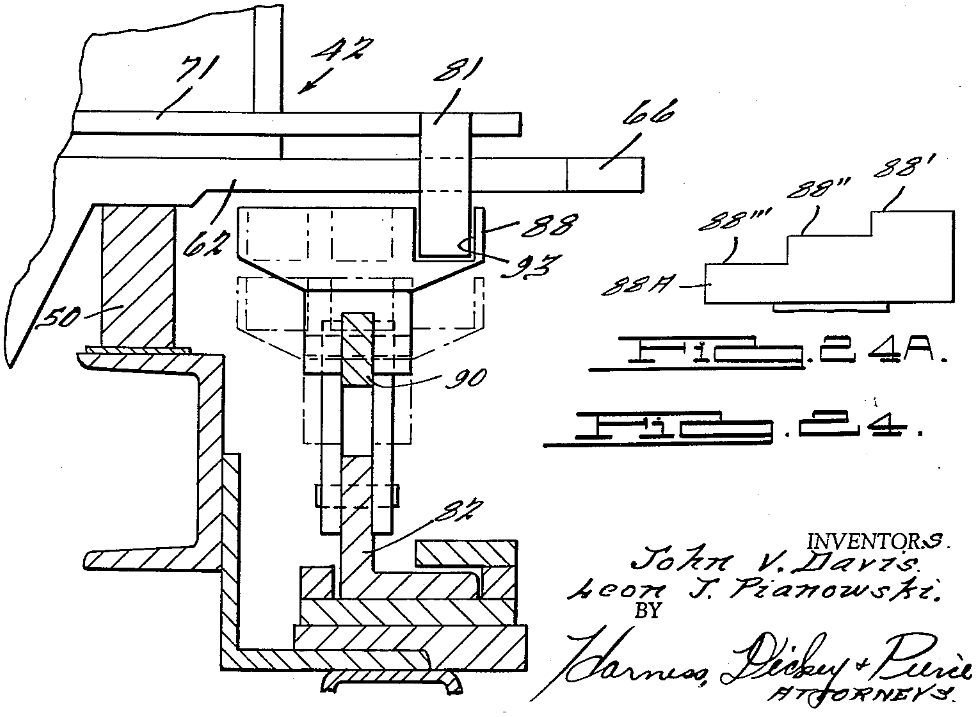
Figure 27:
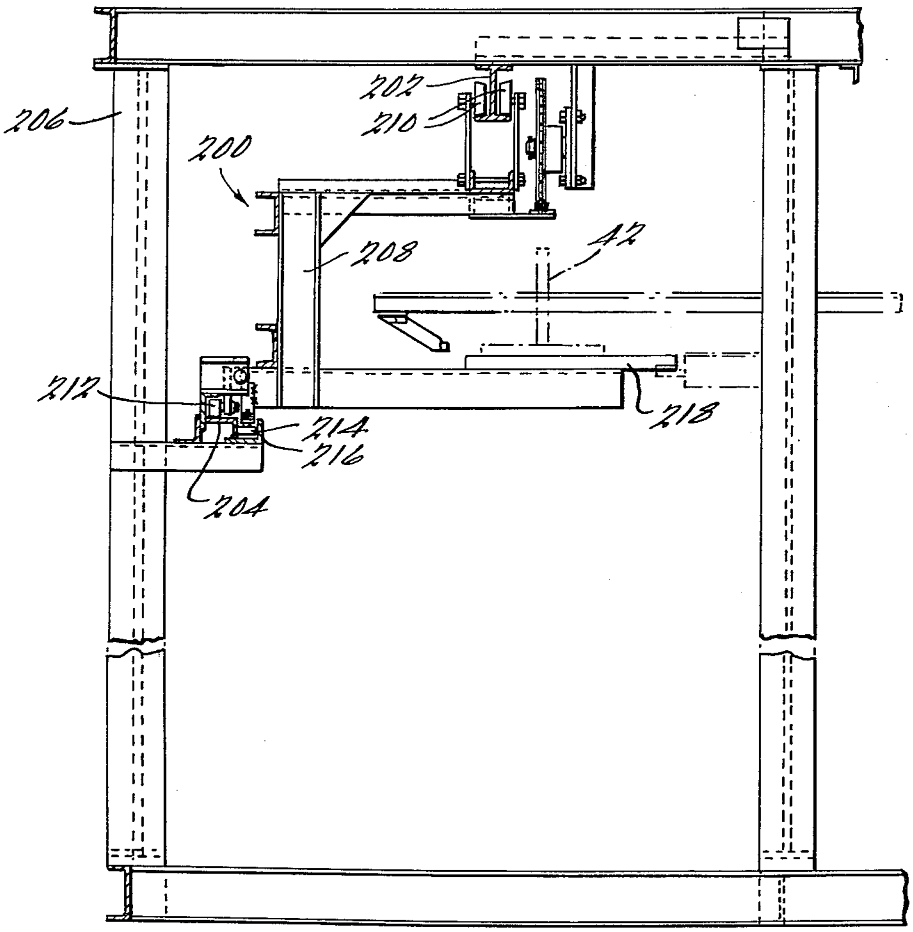
Figures 28, 29:
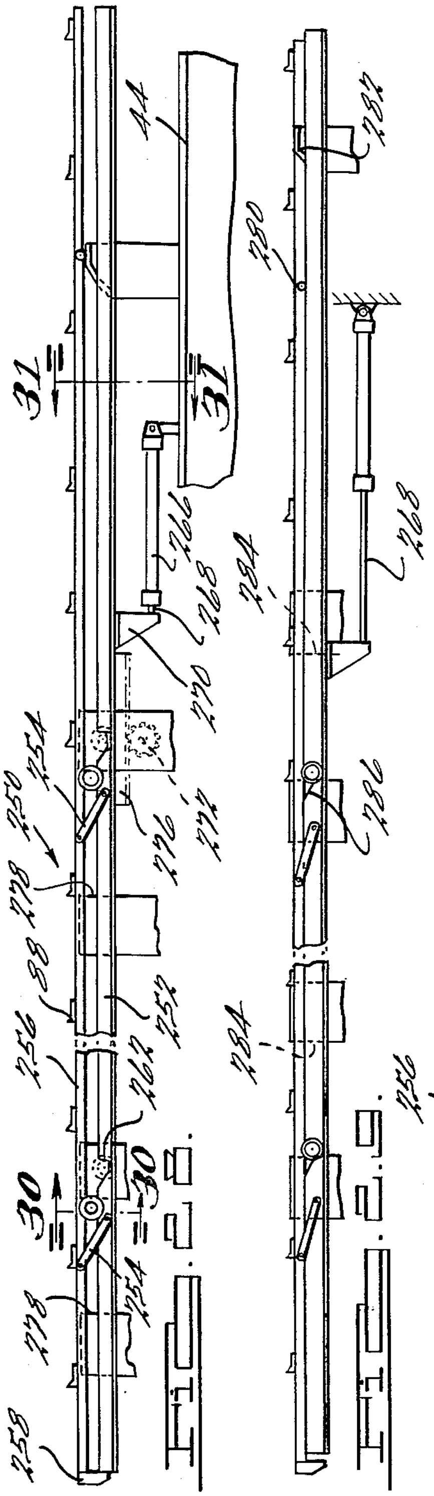
Figure 31:
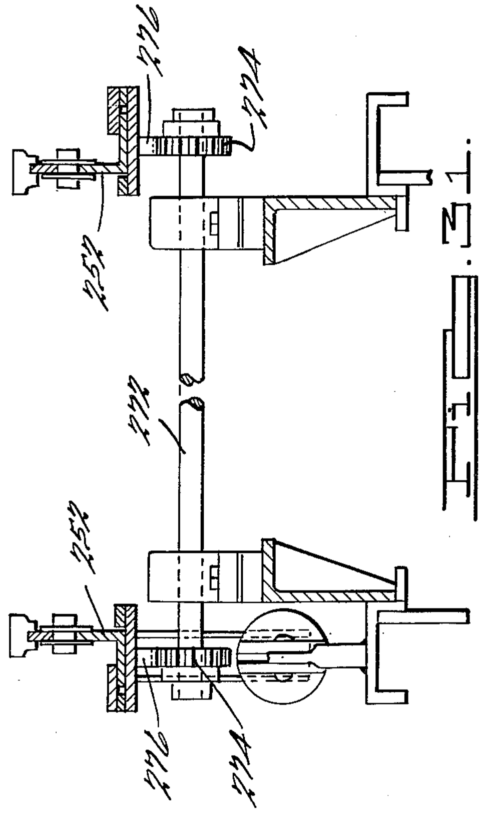
Figure 30:
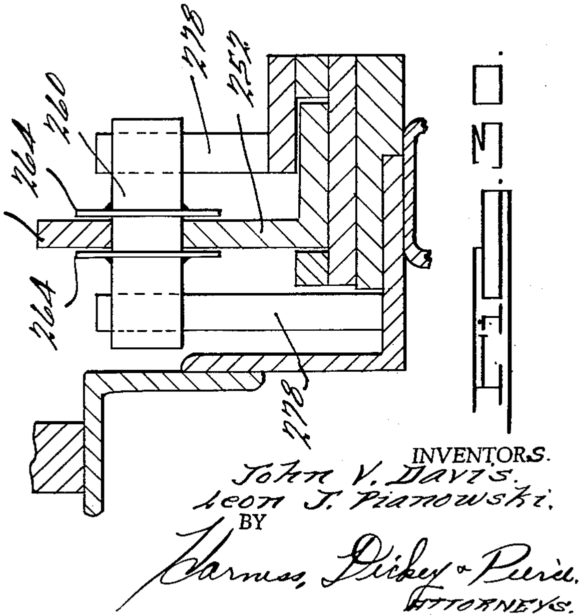
Figure 32:
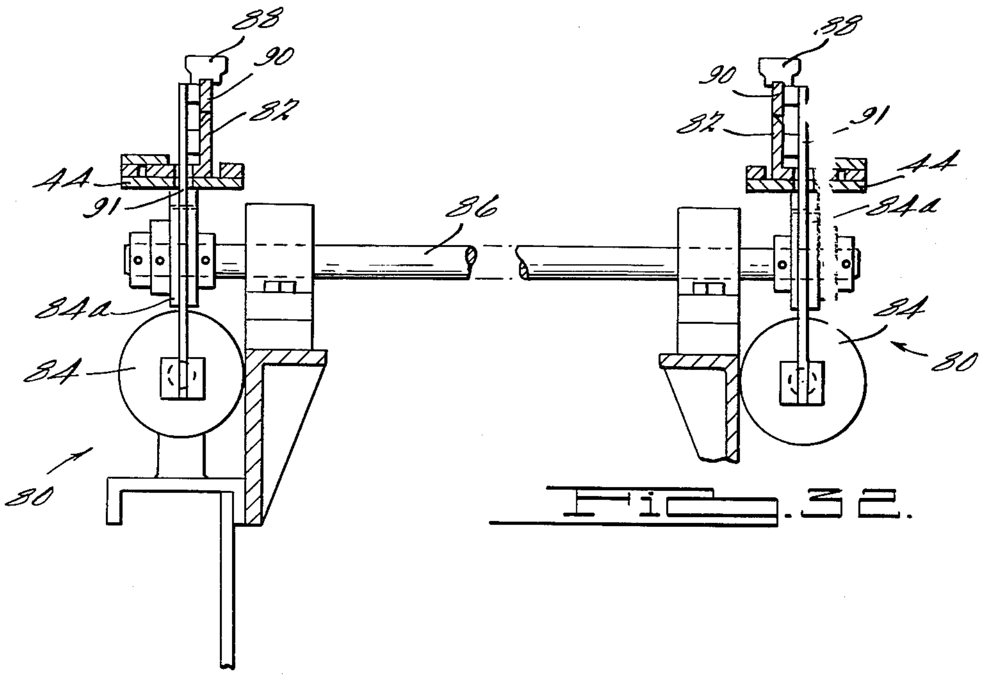
Figure 33:
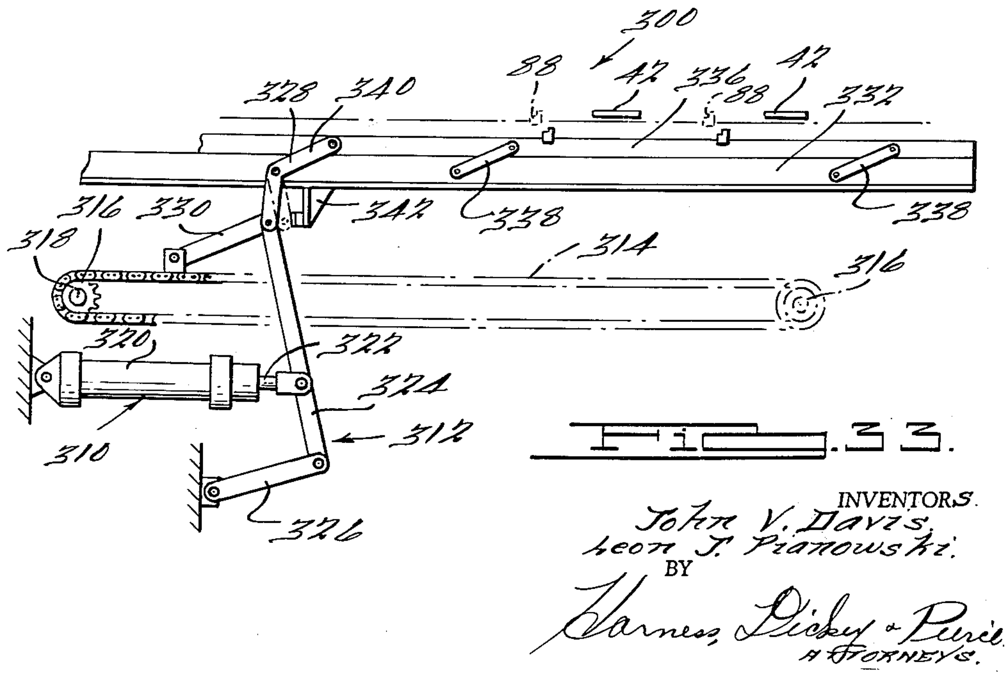
Figure 35:
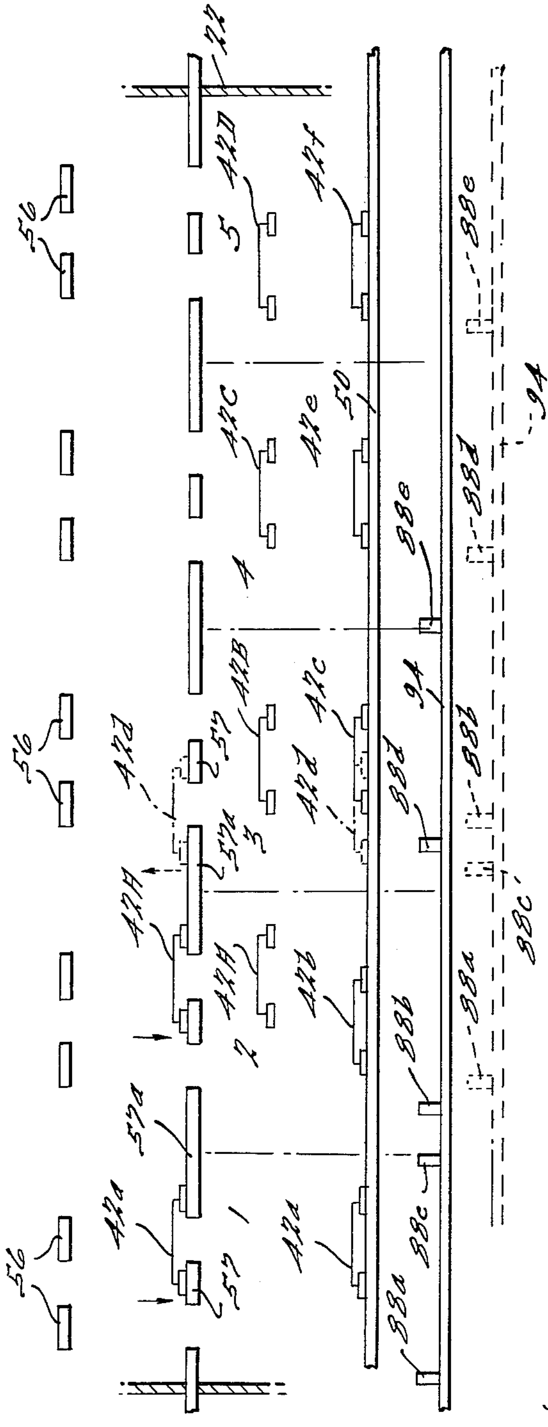
Figure 34:
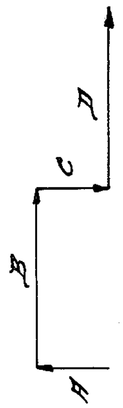
Figure 20:
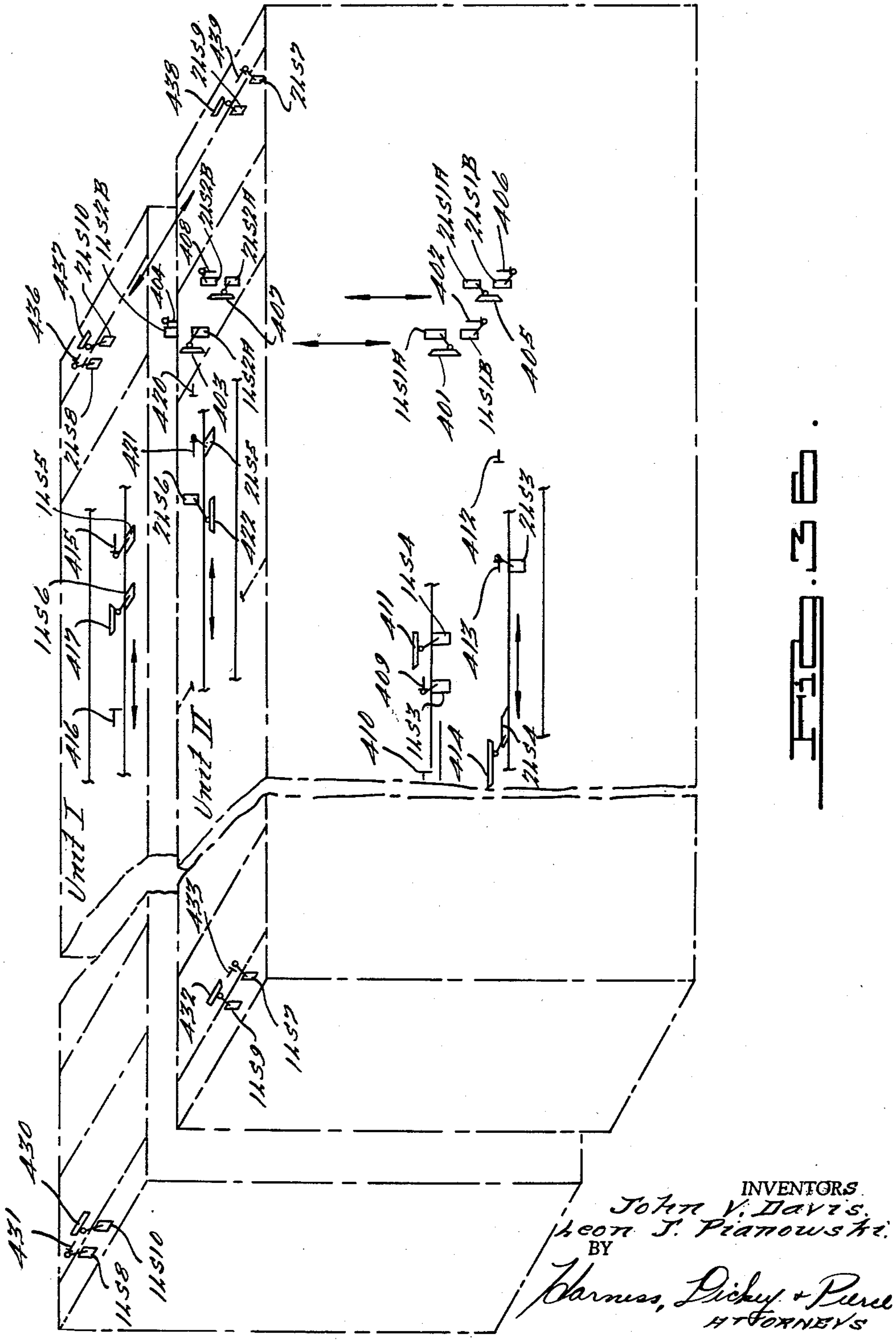
Figure 17:
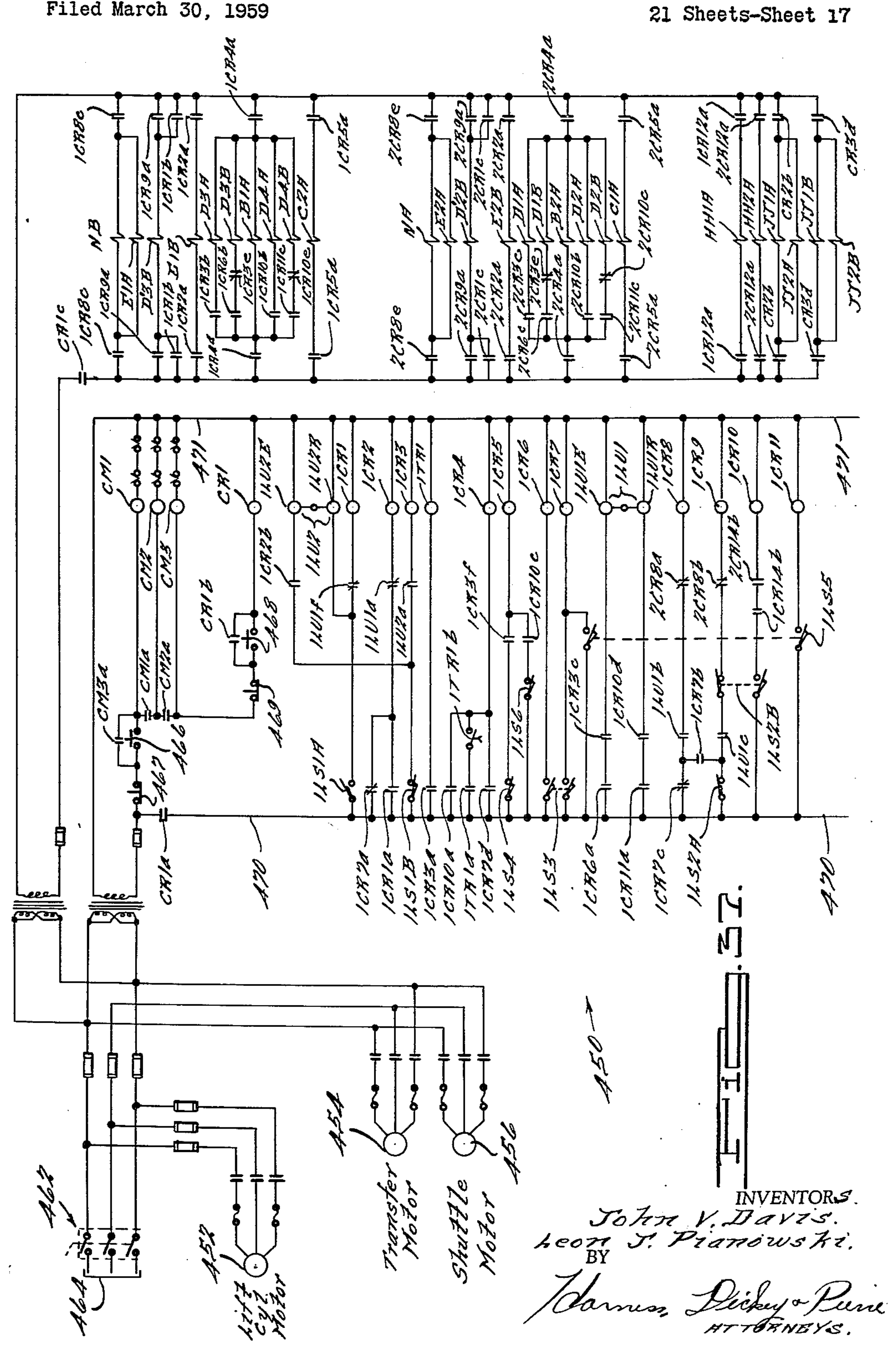
Figure 38:
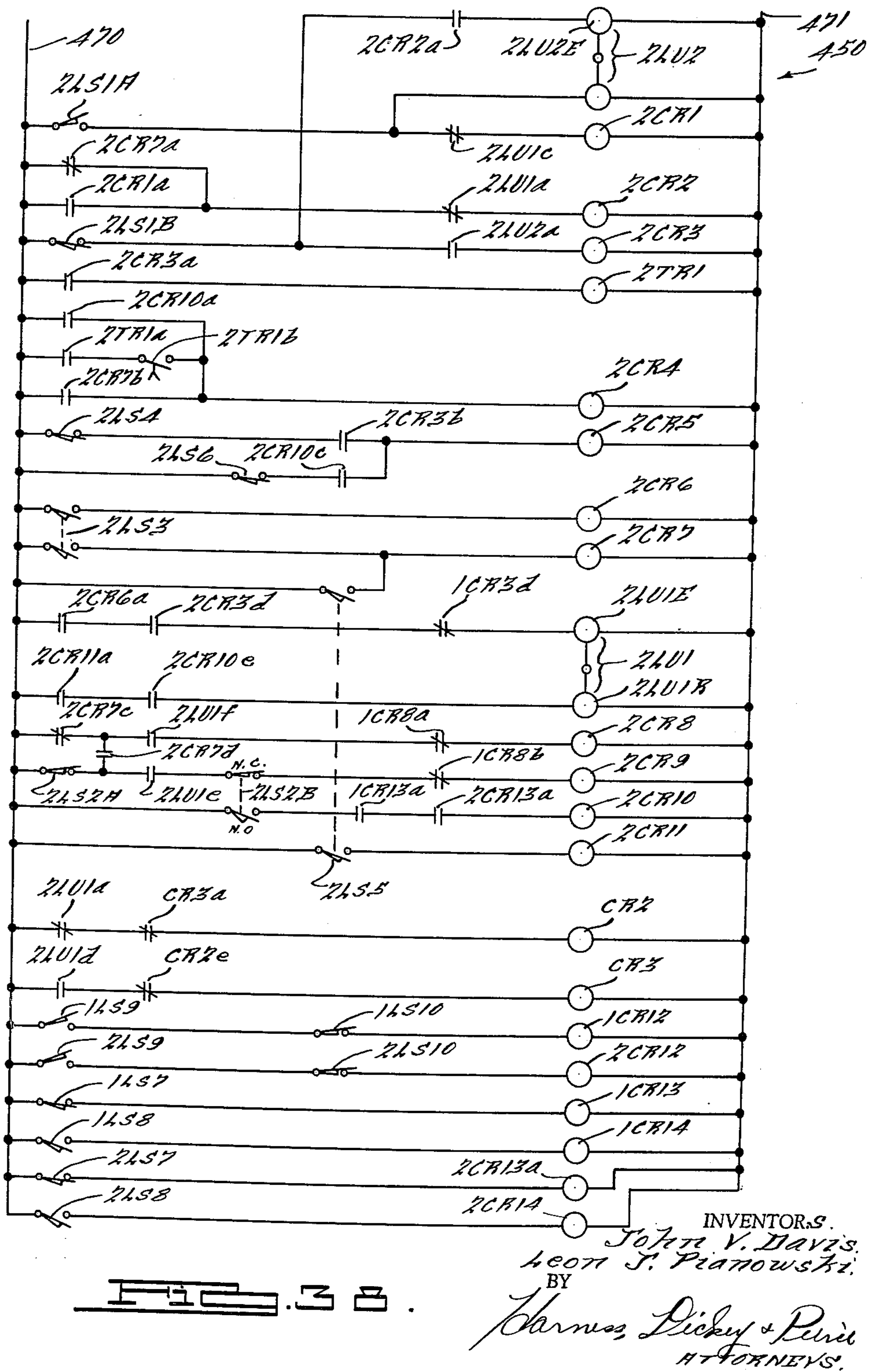
Figure 30:
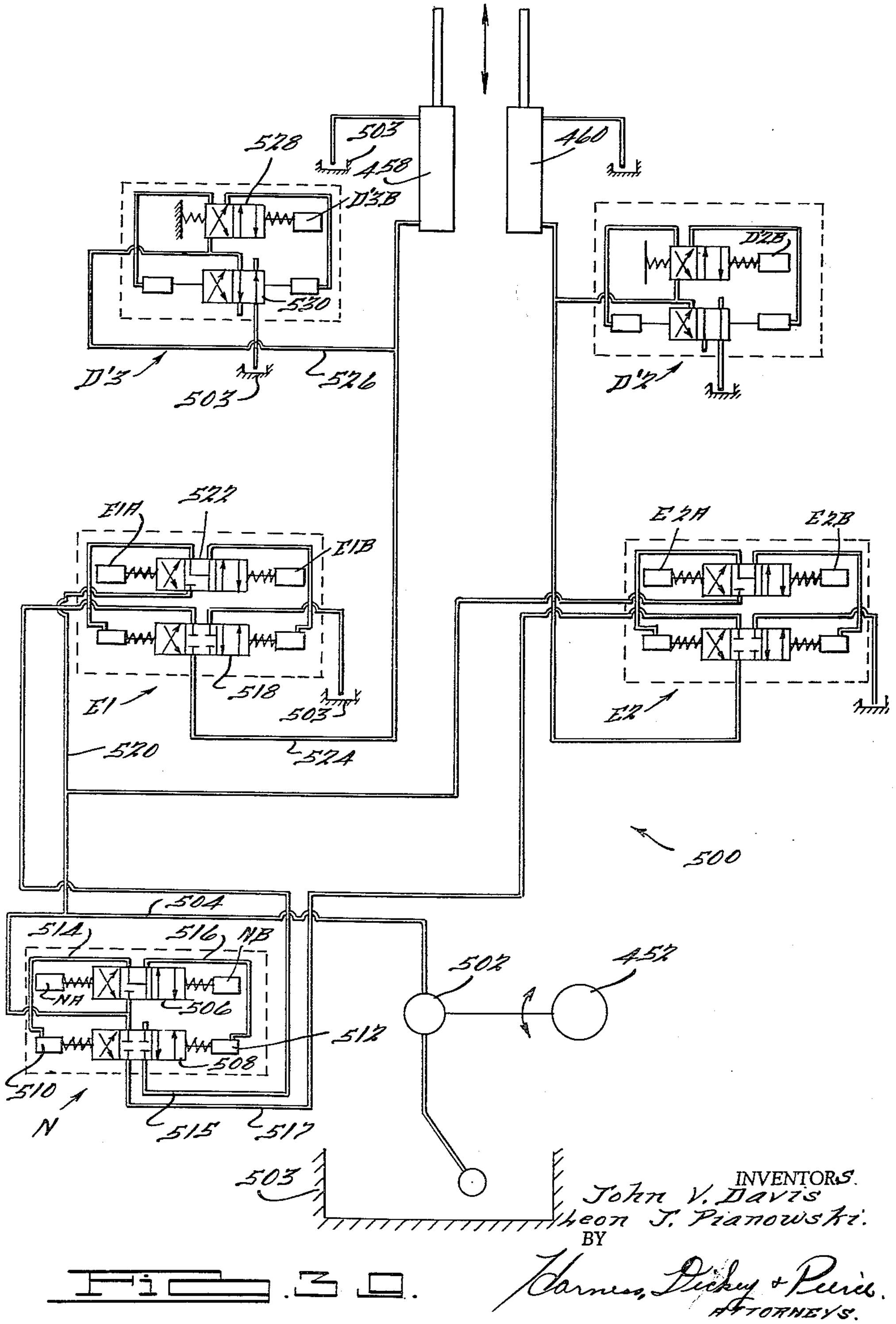

FIGS. 9–13, inclusive, are diagrammatic elevational views of the station selector mechanism on unit I illustrating the different components of the mechanism which are utilized for introducing work carriers to four different stations;

FIG. 13A is a diagrammatic view of a modified form of the station selector mechanism on unit I;

FIG. 14 is a front elevational view of a work carrier in the machine of this invention;

FIG. 15 is a plan view of the carrier shown in FIG. 14;

FIG. 16 is a fragmentary side elevational view of a portion of unit II with the chassis therefor removed;

FIGS. 17, 18 and 19 are transverse sectional views looking substantially along the line 17—17, 18—18 and 19—19 in FIG. 16, showing transversely spaced pushers;

FIGS. 20, 21, 22 and 23 are transverse sectional views of the carrier illustrated in FIGS. 14 and 15, showing different abutment plates of various heights on the carrier for station selection purposes in unit II;

FIG. 24 is a fragmentary elevational view of one end of a carrier and a lower pusher dog in the machine of this invention with some parts being shown in section for the purpose of clarity;

FIG. 24A is a top view of a modified form of the pusher dog in the machine of this invention;

FIG. 25 is a fragmentary plan view of one end of the machine of this invention showing the shuttle mechanism for transferring work carriers from one unit to the other;

FIG. 26 is an end view of the shuttle mechanism looking along the line 26—26 in FIG. 25;

FIG. 27 is an enlarged transverse sectional view looking along the line 27—27 in FIG. 25;

FIG. 28 is a side view of a modified form of pusher mechanism for advancing the work carriers on the lower tracks in the machine of this invention;

FIG. 29 is a side view of the modified pusher mechanism shown in FIG. 28, illustrating a moved position of the mechanism;

FIG. 30 and 31 are fragmentary transverse sectional views looking along the lines 30—30 and 31—31 in FIG. 28;

FIG. 32 is a transverse sectional view of the pusher dogs looking along the line 32—32 in FIG. 6;

FIG. 33 is a diagrammatic side view of another modified form of pusher mechanism in the machine of this invention;

FIGS. 34 and 35 are diagrammatic views illustrating the manner in which a carrier is moved in the machine of this invention;

FIG. 36 is a diagrammatic view of the machine of this invention showing the location of the limit switches in the machine control circuit;

FIGS. 37 and 38 are circuit diagrams showing the machine control circuit; and

Figure 40:
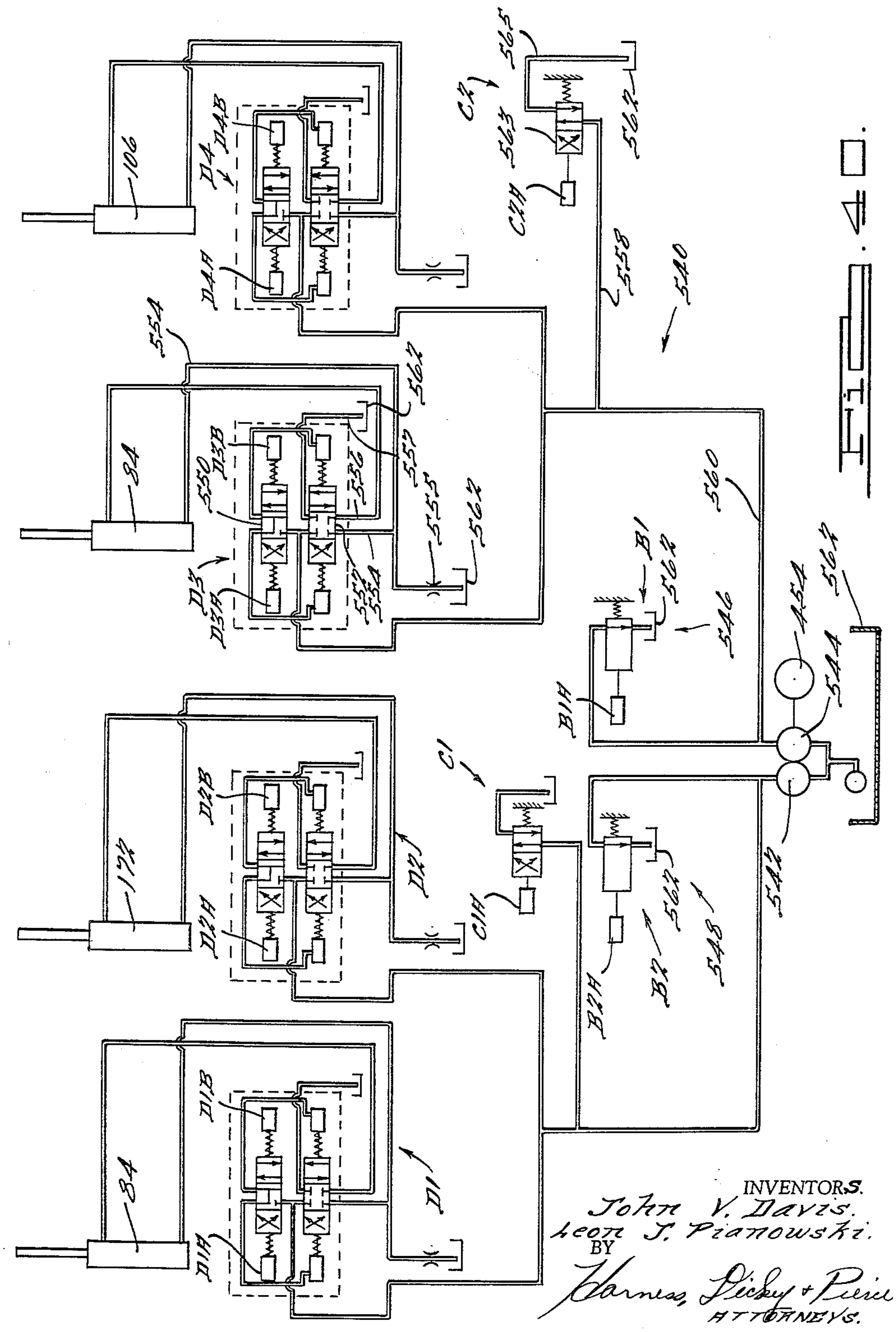
Figure 41:
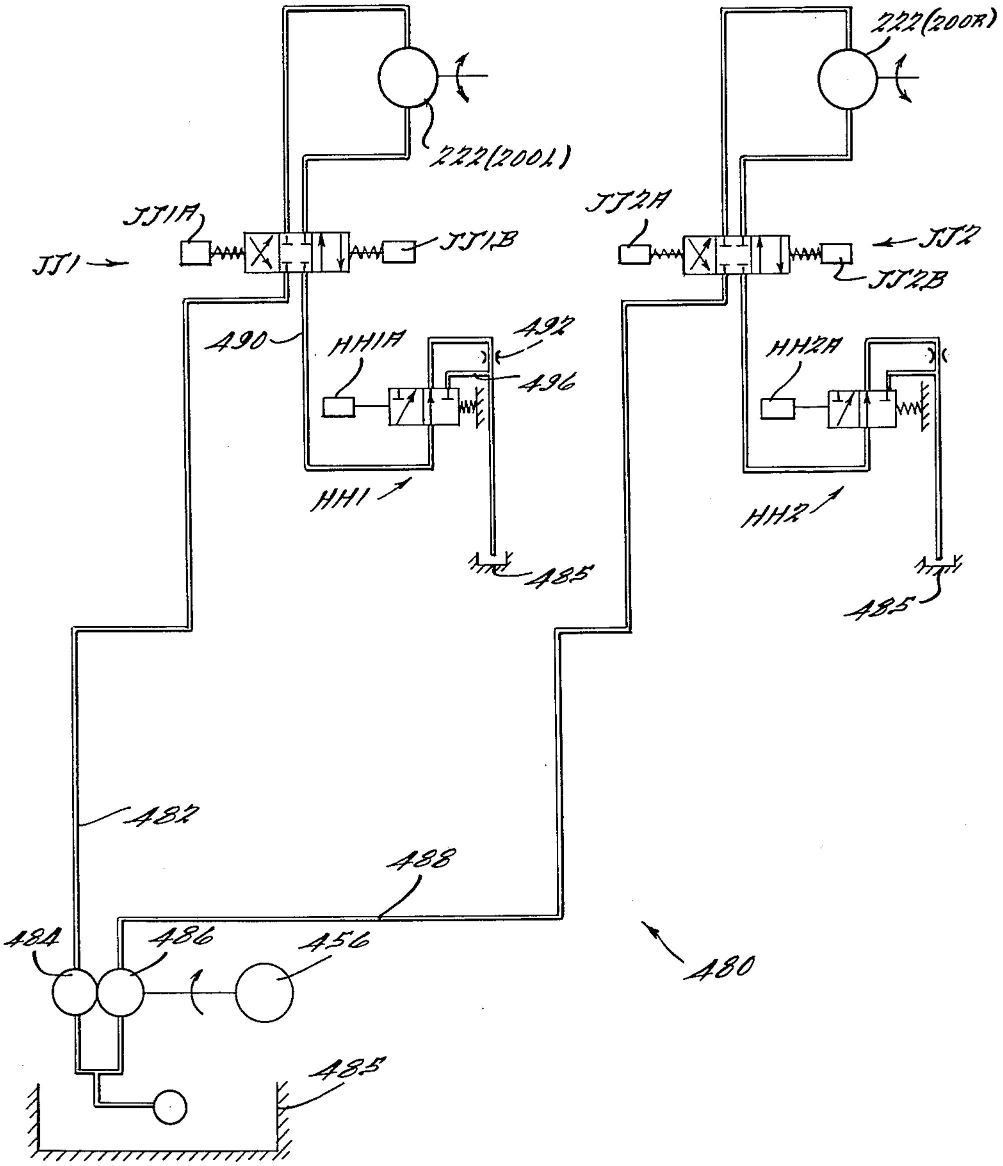

FIGS. 39, 40 and 41 are hydraulic circuit diagrams.

Figure 5:
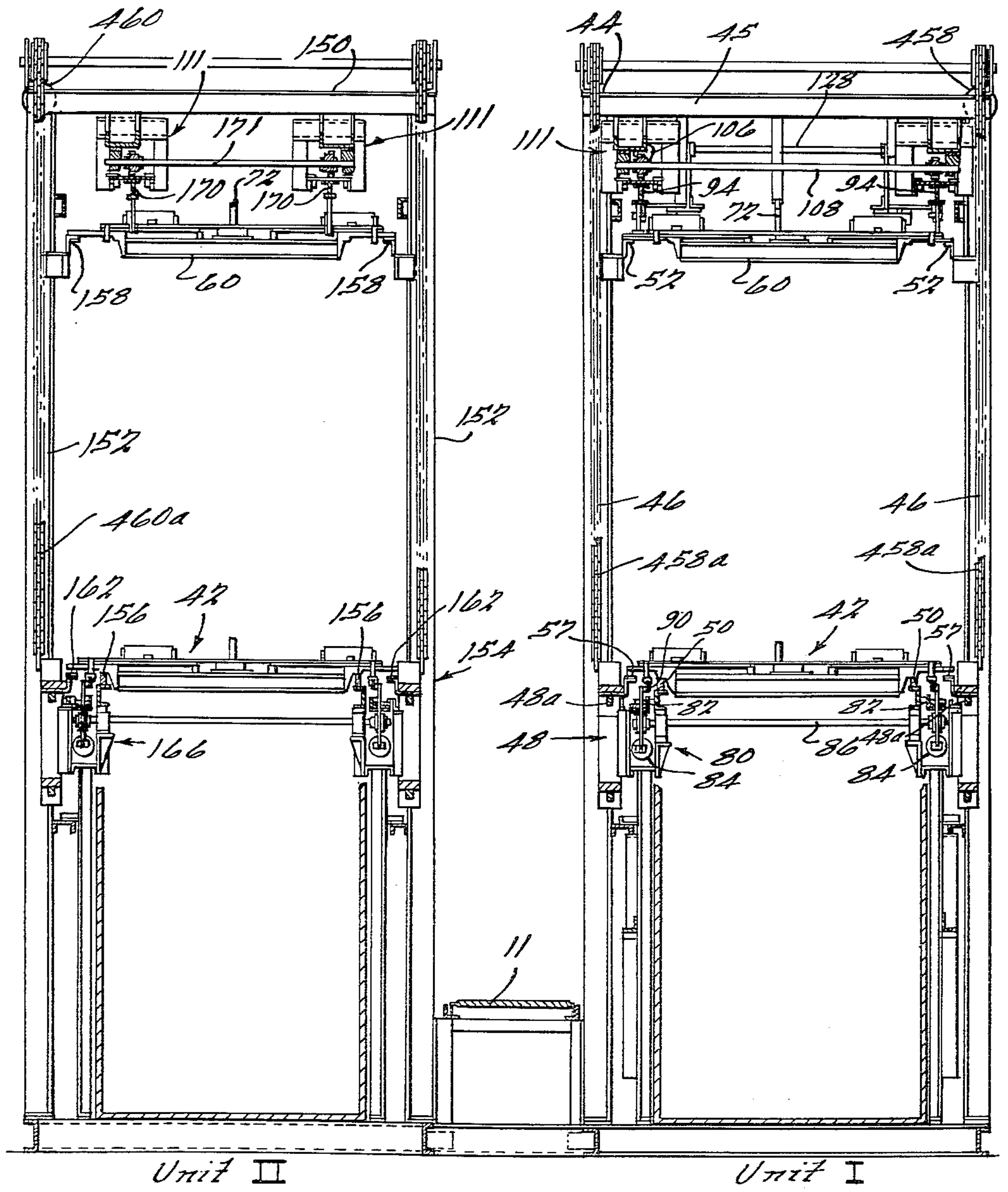
FIG. 5 is an enlarged sectional view looking along the line 5—5 in FIG. 1.
Figure 4:
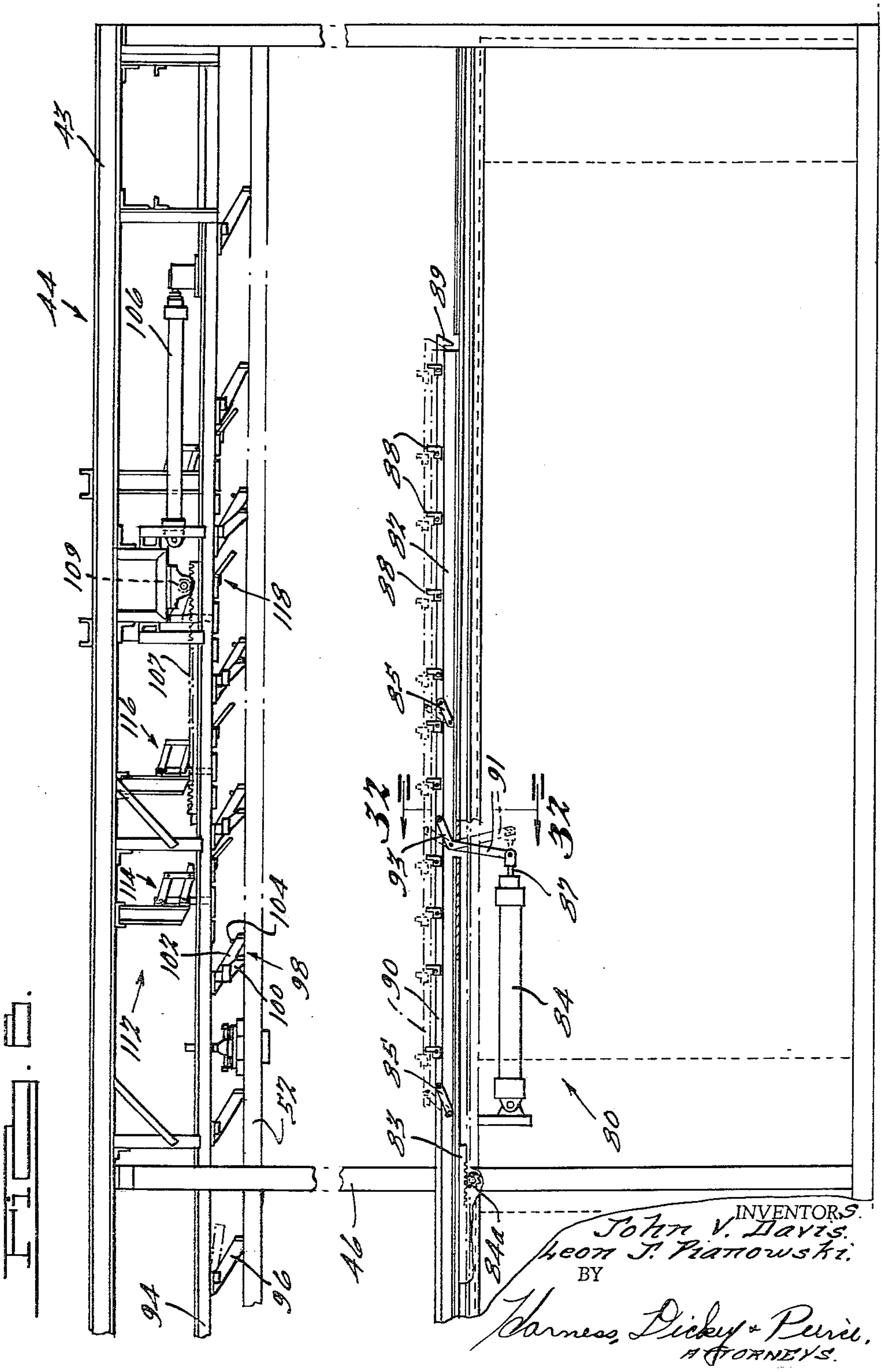

With reference to the drawings, the work handling machine of this invention, indicated generally at 10, is illustrated diagrammatically in FIG. 1 as including straight line units I and II arranged side by side and provided at their ends with shuttle mechanisms 12 for transferring work carriers from one unit to the other. As shown in FIG. 5, the units are of considerable height and are spaced apart sufficiently to provide for the location of a walkway 11 therebetween to facilitate access to the units. Each unit includes a plurality of treatment tanks arranged in a straight line row for applying different solutions to workpieces which are moved in one direction through each unit and dipped in some or all of the tanks in that unit.

It is to be understood that the machine 10 is usable in various treatment operations such as anodizing, plating, phosphating and the like. Since all of these processes use both single and multiple station tanks and involve the selective travel of carrier-supported workpieces through different tanks and different stations in a single tank, the machine of this invention is not described in detail herein with respect to any particular process. The term "station" is used herein to describe a location in the tank at which work on a carrier is treated. The stations for any one tank are designated "first," "second," etc. in the direction of advancement of the work carriers.

The machine 10 is illustrated as being provided with a load and unload station 14 at the left end of unit II. As will clearly appear hereinafter, in machine 10 work carriers move from right to left as viewed in FIG. 1, on unit II and from left to right on unit I. From the load station 14, a work carrier is transferred, by means of one of the shuttle mechanisms 12, to the left end of unit I which has single station tanks indicated by the numeral 18 and multiple station tanks 22. In unit II the single station tanks are indicated at 28 and the multiple station tanks at 30.

The workpieces are suspended from carriers 42 (FIGS. 14 and 15) during their travel through the machine 10 and into and out of the various tanks. In each unit, the carriers 42 are supported on a pair of lower track members during the time that workpieces carried by the carriers are immersed in the tanks and they are supported on a pair of upper track members, parts of which are carried on vertically movable chassis and parts of which are stationary, during the time the workpieces are being transferred from one tank to another, as will clearly appear hereinafter.

Unit I consists of an elongated main frame 44 (FIGS. 5 and 6) which includes upright standards 46 longitudinally extending frame members 43 and cross bars 45. A chassis 48 (FIG. 5), which consists of side frames 48*a* which extend longitudinally of the frame 44 on opposite sides of the tanks 18 and 22, is slidably supported for up and down movement on the frame 44. A lift cylinder 458 at the top of frame 44 is connected by pairs of chains 458*a* to longitudinally spaced parts of the chassis 48 for raising the chassis. A pair of stationary bus bars 50 (FIG. 5) are mounted on and extend longitudinally of the frame 44 at a position between the upper and lower sides of the frame 44 and between the frame members 46. The bus bars 50 are spaced apart in a direction transversely of frame 44 a distance such that they are capable of functioning as lower tracks on which the work carriers 42 are slidably supported during the time that the workpieces on the carriers are suspended in the tanks 18 and 22 for unit I.

A pair of upper track members 52 (FIG. 5) in unit I are mounted adjacent the top side of the frame 44 and are spaced further apart than the bus bars 50. Each upper track member 52 consists of a plurality of short sections 56 (FIG. 3) arranged in pairs, with the sections 56 in each pair being separated by a space 54 which is of a uniform length for all pairs in the illustrated embodiment of the invention. The spaces 54, and the spaces 55 which separate adjacent pairs of sections 56, correspond to and are in vertical alignment with spaced track sections 57 and 57*a*, respectively, on the chassis 48. The space 55 between each pair of sections 56 for a given tank 22 is the same. However, the space 55 between the end section 56 above one tank and the adjacent end section for the next tank may be larger. When the chassis is in its up position the track sections 56, 57 and 57*a* are in horizontal alignment so that the track sections 57 and 57*a* substantially fill the spaces or gaps 54 and 55 to provide for continuous upper track members. As will more clearly appear hereinafter, the chassis 48 moves up and down between the upper position in which the track sections 56, 57 and 57*a* are aligned and a lower position in which the track sections 57 and 57*a* are below the bus bars 50 as shown in FIG. 5. In this latter case, when a carrier is supported on the track sections 57 or 57*a*, during downward movement of the chassis 48 the carrier is transferred to a supported position on the bus bars or tracks 50 when the sections 57 or 57*a* move downwardly past the level of the tracks 50.

In the upper position of the chassis, the work carriers on both the upper and lower tracks may be indexed because both tracks are continuous. However, while the chassis is in its lower position, only the work carriers on the lower tracks 50 can be advanced because the upper track 52 has gaps 53 and 54 through which a carrier could fall. It is to be understood that whether or not the lower carriers in a unit are indexed when the chassis for that unit is in its up position relates to the manner of operation of the machine and it can be operated either way depending on its intended specific use. The operation in which the lower carriers are indexed in both chassis positions is described hereinafter and is shown diagrammatically in FIG. 35 and the operation in which the lower carriers are indexed only in the lower position of the chassis is described in detail with reference to the control circuit 500 (FIGS. 37 and 38).

The work carriers 42 are designed so that each is movable through the upper track gaps 54 and each includes mechanism which can be set to determine the cycle for that carrier. As a result, the carrier structure contributes to the flexibility of the machine 10. As shown in FIGS. 14 and 15, a work carrier 42 includes an elongated beam 60 provided with angle-shape end supports 62 each of which has a horizontal substantially U-shaped portion 64 formed with spaced fingers 66. The space between the fingers 66 is large enough for the track sections 56 and 57 to pass therethrough, and the fingers are spaced a distance apart for support on adjacent sections 56 and adjacent sections 57 and 57*a*, and each finger 66 is of a width such that it is movable vertically through a space 54. A socket member 68 is mounted on the top side of the beam 60 at a position substantially midway between the ends thereof. The members 68 has three openings 70 for supporting an upright actuating rod 72 at any one of three positions spaced longitudinally of the beam 60. When a carrier 42 is mounted on unit I the rod 72 is located at one of three positions which are spaced apart in a direction transversely of unit I for a purpose to appear presently.

It is seen, therefore, that the pairs of fingers 66, which provide the carrier 42 with transverse stability when it is supported, are correlated with the track sections 56 which are likewise arranged in pairs. However, it is also considered within the scope of this invention to provide a single finger 66 at each end of each carrier and provide correlated single track sections 56 in the upper stationary tracks 52. It is also within the purview of this invention to provide for a pick-up of the carriers 42 at their centers by the chassis 48 instead of at their ends.

Likewise for a purpose to appear later, the beam 60 is provided adjacent its ends with upright pusher plates 72*a*, each of which carries a pair of reinforcing bars 74 that extend in opposite directions from a central portion of the plate 72*a*. The bars 74 are mounted on a pair of spaced slide plates 71 which extend longitudinally of the beam 60. The slide plates 71, which are connected by the bars 74 and upright plates 73 at the ends of the plates 72*a*, are slidably mounted on frame members 75 secured to the top side of the beam 60. Bolts 77 carried by the frame members 75 extend through slots 79 in the plates 71 for clamping the plates to the beam 60 in all moved positions of the plates. A smaller abutment plate 76 is secured to the terminal end of each of the reinforcing bars 74 and is positioned in a vertical plane parallel to the pusher plates 72*a* for engagement by pushers advancing the carrier 42.

At their ends, the slide plates 71 carry downwardly extending legs 81 which are engaged by pushers to advance the carrier on the lower tracks 50.

For advancing the carriers 42 on the lower track members 50, a lower pusher assembly 80 (FIGS. 5, 6 and 32) is provided. The assembly 80 includes a pair of pusher rods 82, each of which is illustrated as being of angle-shape in cross section, slidably supported on the frame 44 at positions below the level of the track members 50. Each pusher rod 82 carries a rack 83 which meshes with a gear 84*a* mounted on the frame 44. The gears 84*a* are connected by an equalizer bar 86 (FIG. 32) which extends transversely of the frame 44 and provides for concurrent reciprocation of the pusher rods 82 when a pair of hydraulic cylinder assemblies 84, which are pivotally mounted on frame 44 and correspond to the pusher rods 82, are actuated. Each pusher rod 82 is connected to a parallel bar 90 positioned above and connected to the rod by parallel links 85. A plurality of upwardly extending pusher dogs 88 are secured to the upper bar 90 in a predetermined spaced relation. Each upper bar 90 can thus be swung between a lower position (shown in solid lines in FIG. 6) and an upwardly moved position (shown in dotted lines in FIG. 6) in which a stop 89 at one end of the bar 90 engages one end of the corresponding rod 82.

Each hydraulic cylinder assembly 84 has its piston rod 87 pivotally connected to the lower end of a lever 91 which has an upper end portion 93 that is parallel to the links 85 and is pivotally connected to and extends between the corresponding rod 82 and bar 90. As a result, on extension of the piston rods 87 for the two assemblies 84, which are operated in unison, the levers 91 first pivot about their connections to the rods 82 so that the bars 90 are swung upwardly and to the left as shown in FIG. 6 until the stops 89 engage the ends of the rods 82. On continued extension of the piston rods 87, the rods 82, bars 90 and dogs 88 are moved toward the right.

The dogs 88 have their upper ends located below the depending carrier legs 81 in the lower positions of the bars 90, as shown in dotted lines in FIG. 24. When the cylinder assemblies 84 are actuated to move the pusher rods 82 toward the right as viewed in FIG. 6, all of the dogs 88 swing upwardly to positions engageable with a carrier leg 81, for advancing the carriers 42 toward the right as viewed in FIG. 6.

The pusher dog 88 is shown in detail in FIG. 24 as having appreciable width and being formed with a notch 93 which is located so that it is horizontally aligned with the leg 81 on the illustrated carrier 42. The dotted lines in FIG. 24 indicate the locations in the dog 88 where additional or other notches 93 may be formed.

The plates 71 on the carrier 42 are movable to positions in which the depending legs 81 thereon are either in or out of alignment with the notches 93 in a pair of transversely aligned dogs 88, as desired. The notches 93 in each such pair of dogs 88 are spaced apart a distance equal to the spacing of the legs 81 on the carriers 42. In the embodiment shown, this spacing is constant. On retraction of the piston rods 87, to move the pusher rods 82 to the left, the upper bars 90 fall downwardly under the action of gravity to return the dogs 88 to positions below the work carrier legs 81.

As a result, on retraction of the piston rods 87, the dogs 88 are movable to positions behind the work carrier legs 81 so that on the forward stroke, all the work carriers 42 are advanced a distance equal to the length of the stroke of the cylinder assembly 84 minus the lost motion distance which each dog 88 is spaced behind the work carrier 42 to be advanced thereby. This distance is variable, depending on the location of the pusher dogs 88 on the pusher bars 90 and can be adjusted by relocating the dogs 88. In the modified form of dog 88A shown in FIG. 24A, this lost motion distance is adjustable by adjustment of the location of the legs 81, since the working face of the dog 88A has three sections 88′, 88″ and 88‴, each of which is located a different distance behind a leg 81 to be engaged.

In a multi-station tank 22, the station at which the work on a particular carrier is withdrawn is determined by the location of the legs 81 on the carrier. This is accomplished by locating the pusher dogs 88 in pairs on each bar 90, with the distance between each pair corresponding substantially to the length of the track space 54. The arrangement of the dogs 88 is of course identical on both bars 90. The forward dog in each pair has a notch 93 while the rear dog does not. As a result, a carrier 42 with legs 81 located in alignment with the notches 93 in the forward dogs 88 is advanced by the rear dogs 88 to a position in which it is in vertical alignment with the lower rail sections 57 and 57*a* and the fingers 66 straddle a pair of spaces corresponding to a pair of upper track sections 56. A carrier which has its legs 81 out of alignment with the notches 93 in the forward dogs 88 is engaged by those dogs and moved a distance sufficient to position the carrier fingers 66 in vertical alignment with the spaces between the rail sections 57 corresponding to the fixed rail sections 57 and 57*a*. As a result, the first mentioned carrier is withdrawn from the tank and the last mentioned remains in the tank for subsequent advancement to a position where it is withdrawn.

This same result is obtainable with un-notched dogs 88A of the type shown in FIG. 24A by making the difference in depth between a pair of offset faces 88′, 88″ and 88″, equal to the distance necessary to select a carrier. In other words, this distance is equal to the distance between a notched and an un-notched dog 88 in the above illustration of selection of a carrier to be withdrawn from a tank.

For advancing the work carriers 42 on the upper track members 52, a pair of T-shape pusher bars 94 (FIG. 6) are slidably supported for reciprocal movement on the frame 44 at positions above the track members 52 and each pusher bar 94 is provided with two types of pivotally mounted pusher dog units which depend therefrom and the arrangement of the dog units on the bars 94 is identical so that when a carrier is advanced it is always engaged simultaneously at both its ends by a pair of pusher dogs. A first type consists of a single pusher dog 96 pivotally supported on the bar 94 for up and down swinging movement between a substantially horizontal position adjacent the underside of the bar 94 and a downwardly and forwardly inclined position as shown in FIG. 6. The term "forwardly" has reference to the direction of movement of carriers 42 on unit I. A second type of unit, indicated generally at 98*a–d*, inclusive (FIG. 7), consists of a pair of dogs, a first short dog 100 and a second longer dog 102 which carries a transversely extending rod 104 adjacent its lower end and is positioned ahead of the shorter dog. Each of the dogs 96, 100 and 102 has its upper end mounted on a horizontal pivot 101 (FIGS. 2 and 7) carried by plates 103 suspended from the supporting pusher bar 94 therefor and is movable up and down about the pivot 101 between an upper substantially horizontal position and a lower inclined position in which the upper end of the dog strikes a plate 105 secured to the bottom side of the pusher bar to limit downward swinging of the dog. Each of the pusher bars 94 carries a rack 107 which meshes with a gear 109 mounted on the frame 44. The gears 109 are connected by a transverse equalizer bar 108 so that the pusher bars 94 reciprocate concurrently on actuation of a hydraulic cylinder assembly 106 having its piston rod connected to one of the pusher bars and having its cylinder mounted on the frame 44.

Each pusher bar 94 is supported in spaced slide units 111 (FIG. 2) mounted on the frame 44. A unit 111 includes pairs of rollers 113 which support slide plates 115 secured to the top side of the bars 94. Guide straps 117 on the units 111 overlie the slide plates 115 for maintaining them on the rollers 113.

Figure 3:
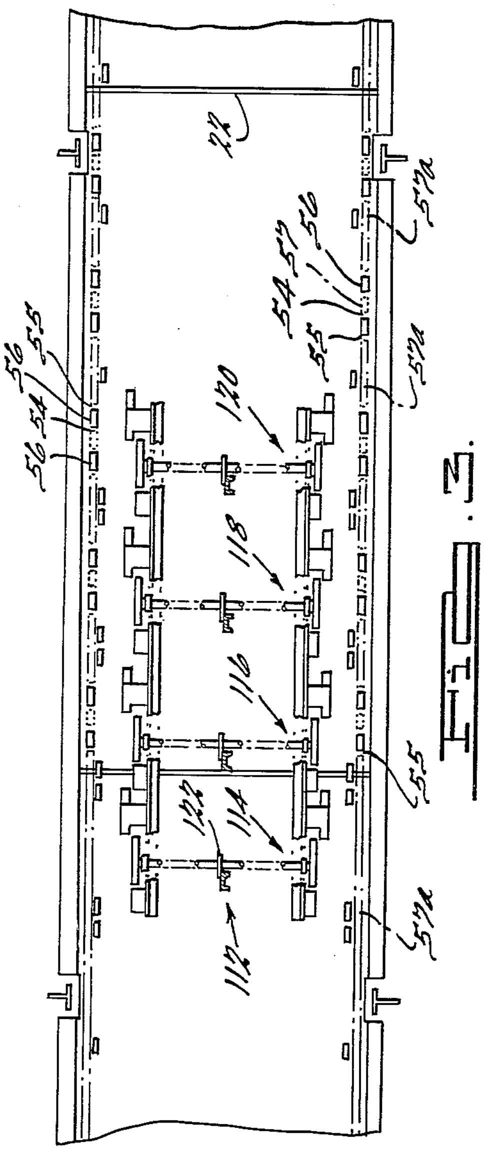
FIGS. 3 and 4 are enlarged fragmentary top plan views of portions of the machine shown in FIG. 1.
Figure 4:
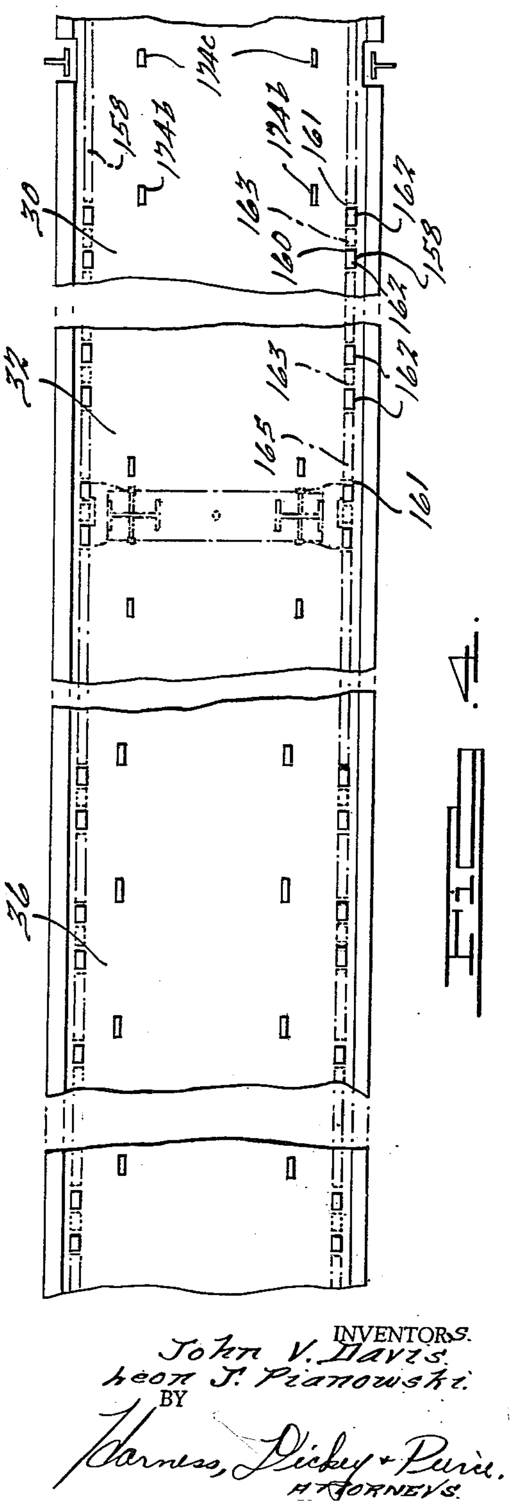

The double dog units 98*a–d* are located in unit I at positions above the multiple station tanks 22 and operate as part of station selector mechanisms, indicated generally by the numeral 112 in FIGS. 3 and 6, to determine for each carrier 42 the tank station at which the workpiece on that carrier will enter the tank. The mechanisms 112 are also usable in the same manner with successive single station tanks to determine which of the tanks will be entered by the workpieces on each carrier. Each mechanism 112 includes a series of four gate assemblies 114, 116, 118 and 120 which correspond to four of the double pusher dog units 98*a*, *b*, *c*, and *d*, respectively.

Since the gate assemblies are identical, only the assembly 114, which is shown in FIGS. 9 and 10, will be described in detail. The assembly 114 includes an inclined operating lever 122 pivotally supported at its upper end on a frame member 124 which depends from a cross member 123 in the main frame 44 for unit I. Intermediate its ends, the lever 122 supports a pair of upwardly projected links 125 which are pivotally connected at their upper ends to the lower end of an inclined operating arm 126 which is secured at its opposite ends to a shaft 128 which extends transversely of the main frame 44. The shaft 128 is rigidly connected at its ends to upright supporting bars 130 for a pair of transversely spaced movable gate members 132 each of which is arranged for movement between a first horizontal position (FIG. 9) located between and in line with a pair of stationary gate members 134 and 136 and a second forwardly moved inclined position (FIG. 10) in which a space 138 separates the member 132 from the member 134. The stationary gate member 136 carries a downwardly and forwardly extending ramp 140 at its forward end, which is spaced behind the stationary gate member 134 in the gate assembly 116. The gate members 132, 134 and 136 support the rod 104 on the corresponding dog 102 in a manner to be described presently. The levers 122 for the gate assemblies for any one tank 22 are aligned in a direction longitudinally of unit I and the levers 122 for different tanks are spaced transversely of unit I for a purpose to appear presently.

In the operation of a station selector mechanism 112 assume that the stations for one of the tanks 22 are designated 1, 2, 3, 4 and 5 in the order they are passed over by a carrier on unit I. As a work carrier 42 approaches a tank, the actuating rod 72 carried thereby may either be in line with the operating levers 122 for the gate assemblies 114, 116, 118 and 120 for that tank or it may be to one side of the levers 122 depending on the socket 70 in which the rod 72 is mounted and the position of the slide plates 71.

In the event it is to one side of the levers 122, none of the levers 122 will be operated during travel of that carrier 42 over the tank. As a consequence, during forward movement of each of the dog units 98*a–d*, the longer dog 122 will be held in its upper position by the travel of the rod 104 therefor on the gate members 132, 134 and 136 until after the shorter dog 100 has engaged the carrier 42. Consequently, the carrier is moved a distance corresponding to the stroke of the pusher bar 94 minus the distance the shorter dog 100 is spaced behind the carrier 42 prior to advance of the pusher bars 94.

This distance is correlated with the position of the dogs 100 so that the carrier 42 is located at a position in which the fingers 66 at opposite ends thereof are supported on pairs of fixed track sections 56 so that the carrier 42 does not descend with the chassis 48. During retraction of the pusher bars 94, the rods 104 travel upwardly on the ramps 140 to positions supported on the gate assemblies so that the longer dogs 102 are again lifted to their horizontal upper positions.

In the event the actuating rod 72 on the carrier 42 is in line with the levers 122, the height of the rod 72 determines at which station the workpiece on the carrier 42 enters the tank. In the event the actuating rod 72 extends above the carrier 42 a distance greater than the distance the actuating lever 122 for the first cell is spaced above the carrier 42, as indicated at "*a*" in FIG. 9, the actuating rod 72 engages the lower end of the actuating lever 122 and swings it upwardly as shown in FIG. 10. Upward swinging movement of the lever 122 causes rotation of the corresponding shaft 128 with a resultant upward swinging movement of the movable gate members 132 carried thereby. The lever 122 is positioned relative to the dogs 96 and 100 so that each carrier 42 which is to enter the tank at the station, which corresponds to this particular lever 22, stops in a lever actuating position shown in FIG. 9 when the forward movement of the pusher bars 94 is terminated. Consequently, on retraction of the pusher bars 94, the rods 104 for the pair of pusher units 98*a* drop through the spaces 138 between the gate members 132 and 136 so that the longer pusher dogs 102 are in position to engage and advance the carrier 42 when the pusher bars 94 are next advanced.

Because the longer dogs 102 are ahead of the shorter dogs 100 in the unit 98*a*, the carrier 42 is advanced an increased distance, relative to the carrier which is advanced by the short dogs 100, by an amount equal to the distance between the lower ends of the dogs 100 and 102 in each unit. This distance is correlated with the location of the stationary upper rail sections 56 and the location of the dogs 100 and 102 in each unit so that this advance is sufficient to locate the carrier 42 on the rail sections 57 and 57*a* on the chassis 48 in a position in which each pair of carrier fingers 66 straddle a fixed rail section 56. Consequently, when the chassis 48 descends, the carrier 42 moves downwardly with it so that the workpiece thereon is immersed in the liquid in the tank at the first station.

When the carrier 42 has been moved out of a position directly below the actuating lever 122 for the first station, the gate member 132 is returned to its position shown in FIG. 9 by the action of gravity. Consequently, on retraction of the pusher rods 94, the rod 104 for the pusher unit 98*a* travels upwardly on the ramp 140 therefor to a supported position on the gate assembly so that the longer pusher dog 102 is held in an upper horizontal position awaiting the next advance of the pusher rods 94, unless another carrier 42 has been moved to a position actuating the lever 122 corresponding to the pusher unit 98*a*.

In the modified form of station selector mechanism 112*a*, a portion of which is shown in FIG. 13A, like numerals with the letter suffix "*a*" indicate like parts on the mechanism 112. In the mechanism 112*a*, the gates 132*a* are mounted on the supporting bars 130 so that when the levers 122*a* are in their unactuated or gravity moved positions, a gap 138*a* is provided between each gate 132*a* and the adjacent fixed gate 136*a*. Consequently, each time the dog unit 98*a* corresponding to the gate 132*a* is moved rearwardly as a result of retraction of the pusher bar 94, the hold-up rod 104 travels up the ramp 140*a* and then downwardly through the gap 138*a* so that the dog 102 carried by the rod 104 is movable to a position behind the carrier 42 which is below the lever 122*a*.

In the event this carrier 42 has a stem 72 which engages and actuates the lever 122*a*, the gate 132*a* is moved to a position, shown in dotted lines, in which it extends between the fixed gates 134*a* and 136*a* so as to completely close the gap 138*a*. As a result, when the pusher bar 94 is retracted the rod 104 is maintained in a position supported on the gate members 132*a*, 134*a* and 136*a* so that when the rod 104 is next moved in a forward direction, the dog 102 carried by the rod 104 is held out of engagement with the carrier 42.

It can thus be seen that in the mechanism 112, the longer dogs 102, which are operable on engagement with a carrier 42 to move it to a position in which the fingers 66 therefor are supported on the chassis rail sections 57 and 57*a*, are normally disenabled, i.e., held up out of engagement with a carrier when the pusher bars 94 are advanced, and are only lowered to operative positions by movement of a carrier 42 to a lever actuating position. In the mechanism 112*a*, on the other hand, the dogs 102 are normally operative and are only disenabled by advance of a carrier 42 to a lever actuating position.

In the event the rod 72 is of a length such that it does not project above the carrier 42 a distance greater than the distance indicated at "*a*" in FIGS. 9 and 11, it passes under the actuating lever 122 for the first station of the tank without engaging the lever 122. Consequently, the shorter dogs 100 for the units 98*a* engage the carrier and advance it only to a position supported on pairs of upper track sections 56 where it remains when the chassis 48 descends. As a result, such a carrier moves past the first station without dipping the workpiece thereon in the tank 22.

The actuating lever 122 corresponding to the second station in the tank is spaced above the carrier 42 a distance indicated at "b" in FIG. 11, which is less than the distance "a," and is actuated by a rod 72 of a length substantially equal to the distance "a." Consequently, if the actuating rod 72 for the carrier 42 is of the length indicated at "a," that carrier will be advanced by the dog 102 in the unit 98b to a position in which it will travel downwardly with the chassis 48 at a position above the second station in the tank. If the actuating rod 72 projects above the carrier 42 a distance equal to the distance "b," as shown in FIG. 12, it will engage the actuating lever 122 for the third station which is spaced above the carrier 42 a distance indicated at "c" in FIG. 12, which is less than distance "b." A carrier which is to move downwardly on the chassis 48 above the fourth station is equipped with an actuating rod 72 which projects upwardly a distance substantially equal to the distance "c" as shown in FIG. 13 so that it engages an actuating lever 122 for the fourth station which is spaced above the carrier 42 a distance less than the distance "c."

It is seen, therefore, that as regards unit I, the location of the actuating rod or rods 72 on a carrier determines the tank or tanks which will be entered by the workpiece on that carrier. Consequently, since each carrier 42 is illustrated as having three sockets 70, it can be set when it is introduced to the machine so that it will enter any number between zero and three of the tanks 22. However, it is to be understood that any number of sockets can be used to accommodate the carrier to the number of tank selections required in a particular process. The length of each rod 72 determines which station of the tank will be entered by a workpiece on a carrier 42. The location of the legs 81 on each carrier determines at which station in each tank entered by the workpiece on that carrier the workpiece will be lifted out of the tank.

It is apparent, however, that a carrier 42 cannot be lifted so as to remove the work thereon from a tank 22 equipped with a selector mechanism 112 prior to movement of the carrier to a position past the gate assembly 120, namely, to a position at the fifth station in the tank 22. If the carrier is lifted prior to this time, the rod 72 thereon will jam into the frame member 124 for the next gate assembly. A tank 22 may, however, have more than five stations in which case the legs 81 can be utilized to determine the tank station at which the work will be removed. Also, the number of gate assemblies may be reduced in a mechanism 112 to make the time of removal of work from the tank more flexible. In an anodizing or plating tank the cell selector mechanism 112 may be omitted so that all work to be treated in the tank enters at the first station, and the legs 81 are utilized to determine the station at which the work will be removed.

It is seen, therefore, that the carriers 42 are readily adjusted and unit I readily adapted to provide the desired carrier travel for obtaining a given travel path for work on a carrier through the tanks 18 and 22. By adjusting the variable components in the carriers in unit I, work on a carrier can be immersed in the desired tanks for the desired times with the desired degree of exposure of the work to the atmosphere between tanks.

Unit II (FIGS. 5 and 16) includes a main frame 150 like the main frame 44, having upright standards 152 on which a chassis 154, like the chassis 48 previously described, is slidably supported for up and down movement. A lift cylinder 460 at the top of frame 150 is connected by pairs of chains 460a to the chassis 154 for raising the chassis. A pair of transversely spaced bus bars 156 extend longitudinally of the frame 150 and function as lower tracks on which the work carriers 42 are slidably supported during the time that workpieces on the carrier are suspended in the tanks for the unit II.

A pair of upper track members 158 in unit II are spaced above the bus bars 156 a distance corresponding approximately to the depth of the tanks in unit II so that when a work carrier 42 is supported on the upper track members 158, the workpiece which is suspended therefrom is above any work carriers on the lower tracks 156. Each upper track member 158 consists of a plurality of short sections 162 arranged in pairs, with the sections 162 in each pair being separated by a space 160 which is uniform for all pairs. The spaces 160, and the spaces 161 which separate adjacent pairs of sections 162, correspond to and are positioned in vertical alignment with spaced track sections 163 and 165, respectively, on the chassis 154. Consequently, when the chassis 154 is moved to its upper position, the track sections 163 and 165 substantially fill the spaces 160 and 161, respectively, so that the upper track members 158 are substantially continuous. As a result, when the chassis 154 is in its upper position, a work carrier 42 is readily slidable longitudinally along the upper track members 158. In a lower position of the chassis 154, the track sections 163 and 165 are below the fingers 66 on the carriers 42 which are supported on the lower track members 156. A pusher or carrier indexing assembly 166, identical to the pusher assembly 80 on unit I, is provided for advancing the carriers 42 on the lower track members 156.

For advancing the work carriers 42 on the upper track members 158, a pair of T-shape pusher bars 170 (FIGS. 5, 16 and 17) are slidably supported on slide units 111 carried by the frame 150 at positions above the track members 158.

Each of the pusher rods 170 carries a rack 169 which meshes with a gear 173 mounted on the frame 150. The gears 173 are connected by an equalizer bar 171, which extends transversely of the frame 150, so that they reciprocate in unison in response to operation of a hydraulic cylinder assembly 172 which has its cylinder mounted on the frame 150 and has its piston rod connected to one of the pusher rods 170. Each pusher rod 170 carries a plurality of depending pusher dogs 174a to e, inclusive, of different lengths with both pusher rods 170 having the same pusher dog arrangement so that the dogs are arranged in pairs, each pair consisting of two identical dogs on transversely opposite sides of the machine.

As shown in FIGS. 17, 18 and 19, in which a dog 174b is illustrated, a pusher dog 174 may be mounted in any one of three positions which are spaced apart transversely of the frame 150. A dog may be mounted for up and down swinging movement about a horizontal pivot 175 carried by a plate 177 secured to one side of the pusher rod 170, it may be supported on a horizontal pivot 179 extended through the pusher rod 170, or it may be supported on a horizontal pivot 181 on a plate 183 on the opposite side of the pusher rod 170.

Each dog is movable between a horizontal inoperative position and a downwardly and forwardly extending operative position defined by the engagement of the upper end of the dog with its support. The dogs 174a are the longest ones and they are of a length such that the lower ends thereof are engageable with the back edge 71a of the rear slide plate 71 on a carrier 42. The dogs 174b to e, inclusive, are all of a length such that they are above and in a clearance relation with the plates 71 for a purpose to appear presently.

The abutment plates 76 for each carrier unit 42 may be any one of the four different heights illustrated in FIGS. 20–23, inclusive. Also, the plates 76 may be placed in any one of three positions spaced transversely of unit II by adjusting the positions of the slide plates 71 as previously described in connection with adjustment of the positions of the legs 81. In any moved position of the slide plates 71 on a carrier 42, the abutment plates 76 are a predetermined distance apart corresponding to the spacing of each pair of dogs aligned transversely of unit II. The pusher dogs 174 which are operable to engage a carrier 42 and move it across the top side of any one tank are arranged in a line in a direction longitudinally of the tank and parallel to the line of movement of the carriers 42.

If a pair of pusher dogs 174 which are aligned transversely of the frame 150 are of a length such that they engage a pair of abutment plates 76 on a carrier 42, they move the carrier 42 far enough on the tracks 158 to locate the carrier on a pair of adjacent track sections 163 and 165 so that the carrier is lowered onto the lower tracks 156 when the chassis 154 moves downwardly. In other words, the dogs 174 are located on the pusher rods 170 and correlated with the stroke thereof such that in the forwardly moved position of the rods 170, the dogs 174 are located so that a carrier 42 has its supporting fingers 66 disposed (*a*) on the vertically movable chassis track sections 163 and 165, if the carrier abutment plates 76 are engaged by the pusher dogs 174, or (*b*) on the stationary upper track sections 162, if the pusher plates 72*a* on the carrier are engaged by the dogs 174.

This arrangement is readily obtained by making the distance between a pusher plate 72*a* and the corresponding abutment plate 76 equal to the distance between the center of a track section 162 and the center of the adjacent track section 163.

Consequently, if it is intended that a particular carrier 42 travel a path such that the work-pieces thereon will not be immersed in a particular tank, it is only necessary to shift the slide plates 71 on that carrier to positions in which the abutment plates 76 on that carrier are located such that they are to one side of the line of pusher dogs 174 for that tank so that each one of the dogs will engage the pusher plates 72 on the carrier.

Assume that it is desired to provide a path of travel for a workpiece carrier 42 such that the workpieces thereon will be immersed in a particular multistation tank 22. The carrier slide plates 71 are adjusted so that the abutment plates 76 are located in line with the pusher dogs for that tank when the carrier is on unit II. The height of the plates 76 on the chosen carrier are such that the workpieces on the carrier will enter the desired cell in the tank. This desired height may be obtained either by fabricating the carrier with fixed abutment plates 76 of the required height, or by providing removable and interchangeable abutment plates or plate sections which can be added to any standard carrier 42 to build up the plates 76 to the required height.

Figure 23:
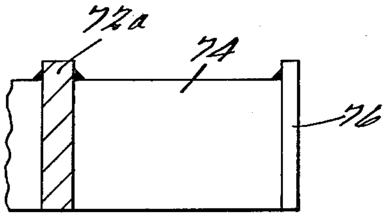

As best appears in FIG. 16, the dogs 174*b* to *e*, inclusive, are arranged in an order of decreasing length in a direction opposite to the direction of movement of carriers 42 on unit II, as indicated by the arrow A. Consequently, if a workpiece on a carrier 42 is to enter a five-station tank 22 at the first station, the carrier is provided with abutment plates 76 which are of a height such that they are engageable by the dogs 174*e* as shown in FIG. 23. Such a carrier 42 is movable by a pair of the pusher dogs 174*e* a distance necessary to position the carrier on the track sections 163 and 165 for the chassis 154 at a position above the first station in the tank 22. The lower pusher assembly 166, which is identical to the assembly 80 previously described, then operates to move the carrier 42 such that it is advanced through the tank 30. At a cell determined by the location of the notches 93 in the lower pusher dogs 88, the carrier 42 is moved onto chassis track sections 163 and 165 for upward movement out of the tank.

In the event the workpieces on a carrier 42 are to enter the second station in the tank 30, the abutment plates 76 for that carrier are constructed (FIG. 22) so that during forward movement of the dogs 174*e*, they clear the plates 76, engage the pusher plates 72*a* and move the carrier only to a position in which the fingers 66 therefor are supported on pairs of stationary track sections 163. However, the dogs 174*d* are of a length such that on the subsequent stroke of the pusher bars 170, a pair of dogs 174*d* engage the abutment plates 76 and move the carrier 42 a distance necessary to move it onto the chassis track sections 163 and 165 for downward travel with the chassis to a position on the lower track members 156 at a position above the second station in the tank 30. Workpieces which are to enter the tank at the third station are mounted on carriers 42 which are constructed such that the abutment plates 76 thereon (FIG. 21) are engageable by the pusher dogs 174*c* but not the dogs 174*d* and 174*e*. Carriers 42 for workpieces which are to enter the fourth cell are provided with abutment plates 76 which are of a height to be engaged only by the pusher dogs 174*b* and not the dogs 174*c*, *d* and *e*. The dogs 174*a* are provided for advancing the carriers between multiple station tanks 30 and from each single cell tank 18 to the next tank.

Since the shuttle mechanisms 12 at opposite ends of units I and II are substantially identical, only one mechanism 12 will be described in detail. One significant advantage of the shuttle mechanisms 12 is that they take up a minimum of space while providing for the necessary transfer of carriers 42 between units I and II. Furthermore, this transfer is accomplished concurrently with up and down chassis movement, thereby affording the greatest time saving.

Each mechanism 12 includes a cart 200 (FIGS. 25, 26 and 27) mounted for travel on a pair of horizontal rails 202 and 204 carried on an upright framework 206 which extends transversely of units I and II at one end thereof. The rail member 202 is mounted on the frame 206 adjacent the top side thereof and the rail 204 is below and to one side of the rail 202.

The cart 200 consists of a main frame 208 (FIG. 26) provided with pairs of upper rollers 210 which ride on the rail 202 and a pair of lower rollers 212 which ride on the rail 204. A pair of rollers 214 are mounted on the frame 208 at a position adjacent the rollers 212 and travel in a track 216 located adjacent the rail 204 for stabilizing the cart 208 against transverse swinging movement during travel thereof longitudinally of the framework 206.

The cart frame 200 carries a pair of cantilever-supported track members 218 which are spaced such that they can be positioned in horizontal alignment with either the upper track members 52 on unit I or the upper track members 158 on unit II.

Adjacent one end of the framework 206 is a sub-frame 220 which supports a hydraulic motor 222 that drives a sprocket 224 mounted on one end of a shaft 226 on the sub-frame 220. The opposite end of the shaft 226 supports a sprocket 228 positioned in the vertical plane of a second sprocket 230 supported on the framework 206 adjacent the opposite end thereof. A chain 232 trained about the sprockets 228 and 230 is connected at 234 to the cart 200. Consequently, on operation of the motor 222 to drive the chain 232 in a clockwise direction as viewed in FIG. 25, the cart 200 is moved from a position opposite the end of unit I to a position opposite the end of unit II. Rotation of the sprocket 232 in an opposite direction moves the cart 200 in an opposite direction to return it to its position opposite unit I.

The motor 222 is controlled so that it operates automatically in a timed relation with the up and down movement of the chassis 48 and 154 which move in opposite directions. When the chassis 48 is in its "up" position, the chassis 154 is in its "down" position and vice versa. When the chassis 48 is moving upwardly, the chassis 154 is moving downwardly at the same rate of speed and vice versa, there being a predetermined time delay period between the time a chassis reaches one position and the time it begins its return movement to its other position. During this time delay period, the carriers are indexed. The hydraulic motor 222 for the cart 200 operates with the same time delay periods as the chassis and moves between its two positions concurrently with movement of the chassis 48 and 154.

Consequently, when a chassis 48 or 154 is in its "up" position, the carts 200 for the mechanisms 12 are positioned so that the track sections 218 on the carts are in horizontal alignment with the tracks 52 or 158 on the chassis 48 or 154, respectively, depending on which one is in its "up" position. During actuation of the upper transfer mechanism for the unit which has its chassis in its "up" position, a first carrier 42 is moved off one set of track sections 218 onto one end of the chassis and a second carrier 42 at the opposite end of the chassis is moved off the chassis onto the other pair of track members 218.

For the purpose of illustrating the operation of the work-handling machine 10 of this invention, the operation of each unit for advancing a workpiece through one multiple-station tank is explained in detail hereinafter. The operation for the other multiple-station tanks will be apparent from the description of one. A carrier 42 is loaded onto the machine at station 14 from which it is transferred to the shuttle mechanism 12 when the chassis 154 is in its "up" position and then to the upper tracks 52 for unit I, when the chassis 48 is in its "up" position. The carrier 42 is then at a position above the first single station tank 18. When the chassis 48 descends, the carrier 42 is lowered onto the lower track members 50 and the workpiece on the carrier 42 is dipped in the solution in the tank 18. During operation of the lower transfer mechanism 80, the carrier 42 remains in a stationary position on the lower track members 50 since no pusher dogs are provided on the pusher assembly 80 at the single station tanks.

On a subsequent upward movement of the chassis 48, the carrier 42 is moved upwardly. In an "up" position of the chassis 48, the carrier 42 is advanced by the upper transfer mechanism across the wall between the first and second tanks 18 so that when the chassis 48 next moves downwardly the carrier 42 moves downwardly to dip the workpiece thereon in the solution in the second tank 18. The carrier is then moved so that this procedure is repeated and the workpieces thereon are dipped successively in all of the tanks 18. In the event a single station tank 18 is to be equipped so that an advancing carrier can select to be immersed or skip such tank, the chassis rail is provided with gaps and permanent track sections and selector apparatus is provided such as is hereinafter described in connection with multi-station tanks.

In the illustrated machine, the carrier track sections 57 are continuous above the tanks 18 so that no workpieces are held out of any tank.

When a carrier 42 reaches a multi-station tank 22, it may or may not be lowered to a position in which the work thereon is dipped in the solution in the tank. This depends on whether or not the carrier stem 72 is aligned with the actuating levers 122 for the cell selecting mechanism for the tank 22, as previously described. If the work on the carrier 42 is to be dipped in tank 22, the stem 72 on the carrier 42 is initially aligned with the levers 122 above the tank and the length of the stem 72 is chosen so that the work will enter the tank at the desired station. In the event the stem 72 for the carrier 42 is of the length illustrated in FIG. 9, the carrier descends at the first station in tank 22. In the event it is to enter at the fourth station, the carrier 42 is equipped with a stem 72 of a length illustrated in FIG. 13. If it is to enter at an intermediate station, it is of one of the lengths illustrated in FIGS. 11 and 12. Assume that the work on the carrier 42 is to travel through all of the stations in the tank 22.

The carrier 42 is equipped with an actuating rod 72 that is positioned such that it actuates the first lever 122 in the selector mechanism 112. Consequently, the carrier 42 moves downwardly with the chassis 48 at a position above the first station in the tank 22. The carrier 42 is moved longitudinally of the tank 22 while it is slidably supported on the lower track members 50 so that the workpieces on the carrier remain in the tank 22 during the time the carriers are being advanced longitudinally of the tank. This is accomplished by locating the lower pusher dogs 88 so that each time the chassis 48 moves upwardly the carrier 42 has its fingers 66 vertically aligned with gaps in the chassis rail corresponding to the fixed upper track sections 56. The tank station at which the carrier moves upwardly, to withdraw the workpieces from the tank, is determined by the location of the depending legs 81 and the location of the notches 93 in some of the dogs 88.

The lower pusher dogs 88 are arranged in pairs at the stations at which selection of carriers to be raised is desired. The first dog 88 is provided with a notch 93 and the second dog 88 is of a solid construction. Consequently, if the notch 93 in the first dog 88 is aligned with the leg 81 on the carrier 42, the leg 81 passes through the notch and is engaged by the second dog 88. The advance of the carrier 42 is accomplished by the second dog 88 and this advance is sufficient only to place the carrier on the lower rails 50 either at a position opposite spaces between chassis track sections 57 and 57*a* so that the carrier will not be raised with the chassis or at a position in which it will be raised, as desired. If the notch in the first dog 88 is located so that the dog engages the carrier, it is either advanced past the space between track sections 57 and 57*a* so that it is raised with the chassis or is positioned in line with the chassis track spaces, as desired. The location of the legs 81 on a carrier is thus correlated initially with the location and construction of the dogs 88 and the stroke of the pusher bars 82 to determine the cell at which work on that carrier will leave a tank.

When the chassis 48 is in its "up" position, the carriers on the chassis track sections 57 and 57*a* and the upper track sections 56 are indexed so that the carrier 42 at the extreme right hand end of unit I as viewed in FIG. 1 is moved onto the cantilever track sections 218 on cart 200 (FIG. 26). The chassis 48 then moves downwardly and during the time it is descending, the cart 200 is traveling from a position in which the track sections 218 are aligned with the upper track on unit I to a position in which they are aligned with the upper track on unit II. The chassis 154 on unit II is being elevated at the same time that the chassis 48 is moving downwardly and the cart 200 is traveling from unit I to unit II. Consequently, when the chassis 154 has reached its upper position, the track members thereon are aligned with the track sections 218 on cart 200. As a result, when the pusher rods 170 are actuated to accomplish an indexing of the carriers on unit II, the carrier 42 is moved off the tracks 218 onto the upper track members 158 for unit II.

The carrier 42 is advanced by pusher dogs 174*a* through the single station tanks 28 to a position on the upper track members 158 preparatory to being advanced to a position above the first station in a multi-station tank 30. As previously described, the location of the abutment plates 76 determines whether or not work on the carrier will be immersed in the tank 30 and the height of the plates 76 on the carrier determines which station in the tank the work will enter. The station at which the work will be withdrawn from the tank is determined by the location of the legs 81. In the event the plates 76 on the carrier are of a height such that they are engaged by subsequent pusher dogs 174 above the tank from which the work on the carrier has just been withdrawn, it will be lowered again so that the work on the carrier will again be immersed in the tank. If re-immersion is not desired the pusher dogs 174 are located so that the abutment plates 76 on the carrier will not be engaged again while the carrier is over the tank. It can thus be seen that the workpieces carried by the carrier 42 may enter different tanks, stay in some tanks longer than others and have different drying times between different tanks, dependinug on the construction and location of the abutment plates 76, the location of the legs 81, the location and lengths of the dogs 174 and the stroke of the pusher bars on which the dogs are mounted, all of which may be determined at the time the carrier 42 is positioned on the machine 10.

FIG. 34 illustrates diagrammatically the operation of the upper and lower pusher assemblies in both units I and II to advance a work carrier through the machine 10. The arrow A indicates upward movement of the chasis 48. The arrow B indicates advance of the upper pushers in the "up" position of the chassis. The arrow C indicates descent of the chassis 48 and the arrow D indicates that only the lower pusher mechanism is actuated when the chassis is "down." All strokes are of course adjustable by adjusting the hydraulic cylinder assemblies.

In FIG. 35 the movement of carriers is illustrated diagrammatically with respect to a multi-station tank 22 having stations indicated by the numerals 1, 2, 3, 4 and 5 and chassis tracks, made up of sections 57 and 57*a* and having gaps corresponding to the upper track sections 56 fixed on the frame 44. The chassis tracks are shown in positions intermediate the upper and lower positions of the chassis. A pusher rod 94 having dogs 88 is shown in solid lines in the position it occupies relative to the track sections 57 and 57*a* prior to movement in a direction to advance the work carriers and in dotted lines after it has been advanced. Assume that a work carrier 42 is lowered on the track sections 57 and 57*a* into a position supported on the lower tracks 50 at a location in which work on the carrier is immersed at the first station. This position of the work carrier is indicated diagrammatically at 42*a*. The pusher rods 94 are then actuated so that the dogs 88*a* engage the carrier 42*a* and move it to a position 42*b*, in which position it is in station number two in vertical alignment with spaces between track sections 57 and 57*a*. The stroke of the rods 94 is indicated by the horizontal distance between the solid and dotted line positions of the dog 88*a*. Consequently, when the chassis is raised, the carrier remains on the lower tracks 50.

The pusher rods 94 are then retracted so that they will be in a position to again advance the carrier 42 when the chassis 48 is again lowered. On the next forward movement of the pusher rods 94 the dogs 88*b* engage the carrier and move it to the position indicated at 42*c* in station number three which is likewise in vertical alignment with the next pairs of gaps in the chassis tracks. Consequently, the carrier 42 is not lifted when the chassis is next raised. If withdrawal of the work on carrier 42 from the tank 22 at station three is desired, the legs 81 on the carrier are aligned with nothces 93 in the dogs 88*b* so that the legs 81 are engaged by the dogs 88*c* which are spaced behind the dogs 88*b* a distance such that the carrier is advanced only to a position shown at 42*d* above chassis track sections 57 and 57*a*. As a result, the opposite ends of the carrier are engaged by the track sections 57 and 57*a* when the chassis is next raised.

From the position indicated at 42*c*, the carrier is moved successively to positions 42*e* and 42*f* in stations four and five by dogs 88*d* and 88*e* and is raised with the chassis 48 at station five.

The travel of a carrier 42A which is lowered onto the lower tracks at a position above station two and is lifted off the lower tracks at a position above station five is illustrated by designating successive positions of the carrier with successive letters suffixes B, C, D, etc.

In FIGS. 28 to 31, inclusive, a modified pusher assembly 250 is illustrated for indexing the carriers 42 on the lower rails 50 or 156, depending on which unit the assembly 250 is assembled with, and illustrated as being applied to unit I. The assembly 250 consists of a pair of pusher rods 252, of angle-shape, slidably supported on transversely opposite sides of the frame 44 for unit I. Each pusher rod 252 is connected by parallel links 254 to an upper bar 256 which carries the dogs 88. An upper bar 256 is thus movable between a lower position resting on the top side of the corresponding pusher rod 252, as shown in FIG. 29, and an upper position spaced above the corresponding rod 252 and shifted longitudinally of the rod 252 a distance limited by the engagement of a stop 258 carried by one end of the upper bar 256 with the corresponding end of the pusher rod 252.

Rollers 260, of cylindrical shape, are movable into and out of corresponding notches 262 in the pusher rods 252. In a position of the rollers 260 out of the notches 262 and between a pusher rod 252 and its corresponding upper bar 256, the rollers 260 maintain the upper bar 256 in its upper position shown in FIG. 28. Each roller 260 is provided with a pair of guide disks 264 positioned on opposite sides of the corresponding pusher rod 252 and upper bar 256 for preventing movement of the rollers transversely of the rods 252 and the bars 256.

A hydraulic cylinder assembly 266 has its cylinder mounted on the frame 44 and its piston rod 268 connected to a depending lug 270 on one of the pusher rods 252. On extension of the piston rod 268, the pusher rods 252 are moved in unison, by virtue of the provision of an equalizer bar 272 provided at its ends with gears 274 which mesh with racks 270 carried by the pusher rods 252.

In the operation of the assembly 250, assume that it is in the position shown in FIG. 28 in which the piston rod 268 is retracted. On extension of the piston rod 268, the pusher rods 252 are moved to the left as viewed in FIG. 28 so that the dogs 88 engage and advance the carriers on the lower tracks 50. On advance of the pusher rods 252 a predetermined distance, the rollers 260 on each of the rods 252 engage fixed stop plates 278 carried by the frame 44 so that subsequent advance of the rods 252 moves the notches 262 to positions below the rollers 260 so that the rollers travel into the notches with a resultant downward movement of the upper bars 256 to the position shown in FIG. 29, which position corresponds to a full extension of the piston rod 268.

On retraction of the piston rod 268, a pin 280 secured to one side of each of the upper bars 256 rides upwardly on an inclined track 282 to raise the upper bars 256 upwardly to their positions shown in FIG. 28 immediately prior to a fully retracted position of the piston rod 268. Concurrently, with movement of the rods 280 upwardly on the tracks 282, the rollers 260 engage other fixed stops 284 which act to hold the rollers 260 while the pusher rods 252 are being moved to the right as viewed in FIG. 29 to move the rollers 260 upwardly along the inclined sides 268 of the notches 262 to positions between the pusher rods 252 and the upper bars 256 as shown in FIG. 28. The pins 280 and their tracks 282 cooperate to reduce the friction load on the rollers 260 during their upper travel on the notch sides 286.

In the assembly 250, the dogs 88 are positively raised and lowered at the ends of the pusher rod travel. The positions at which the dogs are raised and lowered are readily adjustable by moving the stops 278 and 284. Only a single hydraulic cylinder assembly 266 is required for actuating the assembly 250 because raising and lowering of the upper bars 256 takes place in response to longitudinal movement of the pusher rods 252 and the rods move in unison by virtue of their connection by the equalizer bar 272.

Another modified form of pusher assembly 300 is illustrated in FIG. 33 as including a hydraulic cylinder assembly 310, a linkage assembly 312 and an endless chain 314 trained about a pair of sprockets 316 and 317 secured to the frame 44. The sprocket 316 is carried on a shaft 318 which extends transversely of the frame and is secured at its opposite end to a similar sprocket 316 which likewise cooperates with a similar endless chain 314. The cylinder assembly 310 has its cylinder 320 pivotally supported on the frame 44 and has its piston rod 322 pivotally connected to an intermediate portion of a link 324. The lower end of the link 324 is pivotally connected to one end of a link 326, the opposite end of which is pivotally supported on the frame 24. The upper end of the link 324 is pivotally connected to the lower end of a bellcrank 328 and to the upper end of a link 330 connected to the endless chain 314.

The assembly 300 also includes a pair of pusher rods 332 on opposite sides of the treatment tanks, like the rods 252 previously described, and the upper bars 336 connected to the pusher rods 332 by parallel links 338 which are likewise parallel to one leg 340 of the bellcrank 328. The leg 340 is pivotally connected at its lower end to the rod 332 and at its upper end to the bar 336. On extension of the piston rod 322, the bellcrank 328 is moved in a counterclockwise direction as viewed in FIG. 33 to raise the upper bar 336 to a position in which the dogs 88 carried thereby are engageable with carriers 42 on the lower rail of the machine 10. The bellcrank 328 strikes a stop 342 on the pusher rod 332 so that further extension of the piston rod 322 operates to move the pusher rod 332 towards the right as viewed in FIG. 33. Immediately on retraction of the piston rod 322, the bellcrank 328 is swung in an opposite direction to return the upper bar 336 to its position against the pusher rod 332. During back and forth movement of the pusher rod 332, the corresponding pusher rod on the opposite side of the unit is moved in unison by a similar link 330 and bellcrank 328 assembly connected to an endless chain corresponding to the endless chain 314. The assembly 300 likewise requires only the single hydraulic cylinder assembly 310 for operation of a pair of pusher rods 332.

The various limit switches which provide for the above described operation of the machine of this invention have been omitted from FIGS. 1–35 for the purpose of clarity and are illustrated diagrammatically in FIG. 36 mounted on the machine 10, the two units of which are shown in diagrammatic block form.

Unit I has four switches mounted on the frame 44 for operation in response to up and down movement of the chassis 48, a down safety limit switch 1LS1A operated by a cam 401 on the chassis 48, a down limit switch 1LS1B operated by an arm 402 on the chassis, an up safety limit switch 1LS2A operated by a cam 403 on the chassis, and an up limit switch 1LS2B operated by an arm 404 on the chassis.

Unit II has four similar switches, a down safety limit switch 2LS1A, a down limit switch 2LS1B, an up safety limit switch 2LS2A, and up limit switch 2LS2B, mounted on the frame for operation in response to up and down movement of the chassis 154. The down safety limit switch 2LS1A is operated by a cam 405 on the chassis 154, the down limit switch 2LS1B is operated by an arm 406 on the chassis 154, the up safety limit switch 2LS2A is operated by cam 407 on the chassis 154, and the up limit switch 2LS2B is operated by an arm 408 on the chassis 154.

Two switches, 1LS3 and 1LS4, are mounted on the frame 44 for operation by the lower pusher mechanism 80. Switch 1LS3 is a down transfer limit switch for controlling the start and stop positions of the lower pusher mechanism 80 and is operated by an arm 409 on one of the lower pusher rods 82 in the return position of the pusher mechanism 80. In the operated or moved position of the mechanism 80, the switch 1LS3 is operated by an arm 410 on one of the lower pusher rods 82. A cam 411 on one of the lower pusher rods 82 operates the down forward transfer speed control limit switch 1LS4 at the beginning of each operation of the pusher mechanism 80. The switch 1LS4 provides for a slow starting movement of the pusher mechanism 80 so that the dogs 88 are slowly moved into engagement with the carriers 42.

The lower pusher mechanism 166 for unit II has a pair of switches 2LS3 and 2LS4 which correspond to and perform the same functions as the corresponding switches 1LS3 and 1LS4 on unit I. Down transfer limit switch 2LS3 is operated in return position of the lower pusher mechanism 166 by an arm 413 and in the extended position of the pusher mechanism 166 by an arm 412. A cam 414 operates the switch 2LS4 in the return position of the lower pusher mechanism 166.

A pair of switches 1LS5 and 1LS6 are also mounted on the frame 44 for operation by the upper pusher rods 94 in unit I. Up transfer limit switch 1LS5 is operated in the return position of the pusher rods 94 by an arm 415 and in the extended or operated position of the rods 94 by an arm 416. The up forward transfer speed control limit switch 1LS6 provides for slow starting movement of the upper pusher rods 94 toward their extended positions and is operated by a cam 417 on one of the pusher rods 94. A pair of corresponding switches 2LS5 and 2LS6 on the frame 150 for unit II function like the switches 1LS5 and 1LS6. Unit II up transfer limit switch 2LS5 is operated in the extended position of the upper pusher rods 170 by an arm 420 on one of the pusher rods 170 and in the return position of the rods 170 by an arm 421 on one of the rods 170. The up forward transfer speed control limit switch 2LS6 is operated by a cam 422 on one of the rods 170 in the return position of the rods 170.

For convenience of description, the shuttle carts 200 will be hereinafter referred to as 200L and 200R. The cart 200L moves between a position at the left hand end of unit I as viewed in FIG. 36 and referred to as station No. 1 and a position at the left hand end of unit II referred to as station No. 2. The cart 200R moves between stations No. 1 and 2 at the right hand ends of units I and II, respectively. When the cart 200L is moving toward station No. 1, a cam 430 on the cart operates slow in station No. 1 position limit switch 1LS10 which operates to cut down the speed of the cart 200L and an arm 431 on the cart 200L engages station No. 1 position limit switch 1LS8 to discontinue movement of the cart 200L. When the cart is moving in an opposite direction, a cam 432 on the cart engages slow in station No. 2 position limit switch 2LS9 to cut down the speed of the cart and an arm 433 on the cart engages station No. 2 position limit switch 1LS7 to stop the cart. The switches 1LS8 and 1LS10 are mounted on the frame 44 for unit I and switches 1LS7 and 1LS9 are mounted on the frame 150 for unit II. Corresponding switches 2LS8 and 2LS10 are mounted at the opposite end of unit I and switches 2LS7 and 2LS9 are mounted at the opposite end of unit II. No. 1 position limit switch 2LS8 is operated by an arm 436 on the cart 200R and slow in No. 1 position limit switch 2LS10 is operated by a cam 437 on the cart. Slow in station No. 2 position limit switch 2LS9 is operated by a cam 438 on the cart 200R and station No. 2 position limit switch 2LS7 is operated by an arm 439 on the cart 200R.

In FIGS. 39, 40 and 41 the hydraulic circuits which provide for operation of the lift cylinders 458 and 460, the transfer mechanisms, and the shuttle carts 200 are shown. In these circuits the solenoid operated valves whose solenoids are shown in the electrical control circuit 450 are illustrated. To facilitate understanding of the electrical circuit the hydraulic circuits are explained first.

The hydraulic circuit 500 for the lift cylinders 458 and 460 is illustrated in FIG. 39 as including a pump 502 operated by a motor 452 and connected to a fluid supply tank 503. The pump 502 is connected by a line 504 to a valve unit N, which includes a pair of solenoids NA and NB operable to move a first spool member 506 in opposite directions and effect movement of a second spool member 508, which is operated by hydraulic actuating mechanisms 510 and 512 arranged at opposite ends of the spool 508 and connected to the spool 506 by lines 514 and 516. A pair of lines 515 and 517 extend from the spool 508 to pairs of valve units which correspond to the lift cylinders 458 and 460. A pair of valve units E1 and D3 are provided for the lift cylinder 458, and a pair of identical valve units E2 and D2 are provided for the lift cylinder 460. Since the two valve units are identical for each lift cylinder, only the valve units E1 and D3 will be described in detail.

The line 515 is connected to a hydraulically-operated spool 518 in the valve unit E1. A pressure line 520 connected to the line 504 is connected to a solenoid-operated spool 522 in the valve unit E1. Movement of the spool member 522 provides for hydraulic actuation of the spool 518, which is connected by a line 524 to the closed end of the lift cyilnder 458. A line 526 connected to the line 524 supplies fluid to the solenoid-operated spool 528 and the hydraulically-operated spool 530 in the valve unit D'3.

Assume that operation of the lift cylinder 458 to lift the chassis 48 is desired. The solenoids NB and E1A are energized. As a result, the spool 506 is moved to the left to a position in which fluid from the line 504 passes through the spool 506 into the line 514 to the hydraulic mechanism 510 which moves the spool 508 to the right to a position in which fluid passes from the line 504 through the spool 508 to the line 515. Because the solenoid E1A is energized, fluid from the pressure line 520 travels through the spool 522 and actuates the spool 518 so that fluid from the line 515 travels through the spool 518 into the line 524 and is supplied to the closed end of the lift cylinder 458 resulting in lifting of the chassis 48.

The valve unit D'3 is provided for cushioning the movement of the chassis 48 and in order to cushion upward movement of the chassis, the solenoid D'3B is energized as the chassis approaches the upper limit of its travel. As a result, some of the fluid from the line 524 travels through the line 526, through the spool 528, and actuates the spool 530 so that some fluid passes therethrough from the line 526 into the tank 503. As a result, less fluid is supplied to the cylinder 458 so that the upward movement of the chassis 48 is cushioned.

The valve units E2 and D'2 operate in the same manner for controlling operation of the lift cylinder 460 which moves the chassis 154.

The hydraulic circuit 540 for the hydraulic cylinder assemblies 84, 106, 84 and 172 in the upper and lower pusher mechanisms is illustrated in FIGURE 40 as including a pair of pumps 542 and 544 driven by a motor 454. The pumps are connected to vent valves B1 and B2, which constitute parts of subcircuits 546 and 548 corresponding to units I and II. Subcircuit 548 includes a pair of valve units D1 and D2 which control the lower and upper transfer cylinders, respectively, in unit II, and a slow speed valve unit C1. Since the subcircuit 546 includes three similar valves D3, D4 and C2 corresponding to the valves D1, D2 and C1, only the subcircuit 546 will be described in detail.

The valve unit D3 includes a pair of solenoids D3A and D3B which control the movement in opposite directions of a spool 550 which, in turn, controls the flow of fluid to opposite ends of a spool 552 which is connected by a pair of lines 554 and 556 to the closed and rod ends, respectively, of the hydraulic cylinder assembly 84.

The valve unit D4 is identical to the valve unit D3, and is connected in the same manner to the upper cylinder assembly 106. The slow speed valve unit C2 is a dead end for a line 558, which constitutes a spur on the main line 560 that connects the pump 544 to the valve units D3 and D4, when the solenoid C2A for the valve unit C2 is deenergized. When the solenoid C2A is energized, the valve spool 563 is moved to a position in which it connects the line 558 with a line 565 which empties into the fluid supply tank 562 for the pumps 542 and 544. Consequently, when the solenoid C2A is energized, some of the fluid from the line 560 is bled off to thereby reduce the amount of fluid supplied to either the cylinder 84 or the cylinder 106, depending upon which cylinder is being actuated at that time. As a result, the movement of the pusher rods actuated by the cylinder continues at a slow rate of speed.

Assume the solenoids D3A, B1A and C2A are energized. Fluid from the pump 544, which is normally returned to the tank 562 when the solenoid B1A is deenergized, is blocked at the valve B1 when the solenoid B1A is energized. Consequently, fluid under pressure is supplied through the line 560 to the spool 550 in the valve unit D3. Since the solenoid D3A is energized, fluid travels through the spool 550 to the right-hand end of the spool 552 to thereby move it to the left, as viewed in FIG. 40, so that the fluid from the line 560 travels through the spool 552 into the line 554 and is supplied to the closed end of the cylinder 84 for moving the pusher rods associated with the cylinder 84 in a forward direction. A restrictor valve 555 in a portion of line 554 leading to tank prevents a sufficient flow of fluid to tank to reduce the speed of travel of the pusher rods below the desired speed. Fluid forced out of the rod end of the cylinder travels through the line 556 to the spool 552 and thence to a line 557 which empties into the tank 562. Since the solenoid C2A is energized, this forward movement will be at a slow speed until the solenoid C2A is deenergized.

In the event the solenoid D3B had been energized instead of the solenoid D3A in the above example, fluid entering the spool 550 would have been delivered to the left-hand end of the spool 552 so that fluid entering the spool 552 from the line 560 would then travel through the line 556 to the rod end of the cylinder 84 for retracting the pusher rods associated with the cylinder. Fluid forced out of the cylinder 84 travels through the line 554 to tank.

The hydraulic circuit 480 for the shuttle carts 200L and 200R is illustrated in FIG. 41 as including a pair of valve units HH1 and JJ1, connected to the hydraulic motor 222 for the cart 200L, and corresponding valves HH2 and JJ2 connected to the motor 222 for the cart 200R. The valves JJ1 and JJ2 each have a pair of solenoids designated by the letter suffixes A and B, and the valves HH1 and HH2 each have a single solenoid designated by the letter suffix A.

The valve JJ1 is connected by a line 482 to a pump 484 driven by the motor 456 and connected to a fluid supply tank 485. A second pump 486, likewise driven by the motor 456, is connected by a line 488 to the valve unit JJ2.

Assume that the solenoids JJ1A and JJ2A have been energized. Fluid from the line 482 will be directed by the valve unit JJ1 to the motor 222 such that the motor will rotate in one direction. As will later be described in detail, this rotation will provide for movement of the cart 200L to a position at one end of unit I. The energizing of solenoid JJ2A will provide for flow of fluid from the line 488 to the motor 222 so as to drive the cart 200R to a position at the opposite end of unit I. If the carts are to be positioned at the ends of unit II, the solenoids JJ1B and JJ2B are energized.

Whenever the solenoid HH1A is deenergized, the speed of travel of the cart 200L is reduced. The deenergizing of the solenoid HH2A has the same effect on travel of the cart 200R. When the solenoid HH1A is deenergized, fluid from the motor 222 travels through the valve JJ1 into a supply line 490 for the valve unit HH1, and through the valve unit HH1 to a manually adjustable restrictor valve 492, and from the valve 492 into the tank 485 for the pump 484. When the solenoid HH1A is energized, fluid from the line 490 is directed into a bypass line 496 which bypasses the manual restrictor valve 492 and communicates directly with the tank 485.

In the operation of the machine 10, assume that both the chassis 48 and 154 are in their down positions, which condition exists when the machine is first installed or when the machine has been idled for an extended period of time. Further assume that all the electrically held relays in the control circuit are deenergized and the mechanical latching type relays are in their tripped unlatched positions. These latter relays are designated 1LU1, 1LU2, 2LU1 and 2LU2. Because the chassis 48 and 154 are down, the normally open switches 1LS1B and 2LS1B are held closed and the normally closed switches 1LS1A and 2LS1A are held open. The upper chassis operated switches 1LS2A and 2LS2A are closed. The switches 1LS2B and 2LS2B each have two sets of contacts, one of which is closed and the other open. Assume that the pusher mechanisms on each unit are retracted so that the speed control limit switches 1LS4, 2LS4, 1LS6 and 2LS6 are closed and the transfer limit switches 1LS3, 2LS3, 1LS5 and 2LS5, are open. Assume that the shuttle carts 200L and 200R are between stations No. 1 and No. 2. Consequently, 1LS7, 1LS8, 2LS7 and 2LS8 are open and 1LS9, 1LS10, 2LS9 and 2LS10 are closed.

With reference to the control circuit 450, a portion of which is shown in FIG. 37 and another portion in FIG. 38, the three motors for operating the chassis, pusher mechanisms, and shuttle carts are shown at 452, 454 and 456, respectively.

To start the motors 452 and 454 and 456, a disconnect switch 462 connected to a suitable source of current 464 is closed and a start switch 466 is also closed to energize the starting relay CM1 for the lift cylinder motor 452. Closing of the contacts CM1*a* causes energizing of the starting winding CM2 for the pusher mechanism motor 454 and closing of contacts CM2*a* causes energizing of the starting relay CM3 for the shuttle operating motor 456. Energizing of relay CM3 causes closing of contacts CM3*a* which lock in the starting switch 466 so that operation of a stop switch 467 is required to stop the motors 452, 454 and 456.

To start the machine 10, a start switch 468 is closed to energize control relay CR1 which closes contacts CR1*a*, CR1*b* and CR1*c*. Closing of contacts CR1*a* completes a circuit through the leads 470 and 471, normally closed contacts 1CR7*a* and 1LU1*a* to energize unit I down relay 1CR2. The contacts CR1*b* lock in the machine start switch so that the machine will operate automatically until a stop switch 469 is actuated. Closing of the contacts CR1*c* provides for a flow of current to the solenoid portion of the circuit 450 as will appear presently.

Energizing of relay 1CR2 closes contacts 1CR2*a* to in turn energize unit I down solenoid E1B. Energizing of this solenoid provides for a bleeding off of oil in the unit I lift cylinders 458 to make sure that the chassis 48 is in a fully lowered position. Energizing of relay 1CR2 also causes closing of contacts 1CR2*b* to complete a circuit through normally closed 1LS1B and the energizing winding 1LU2E for safety interlock relay 1LU2. This relay is of the type that will latch in the closed position until its release winding 1LU2R is energized. Energizing of winding 1LU2E causes closing of contacts 1LU2*a* so that a circuit is completed through unit I down repeater relay 1CR3 having normally open contacts 1CR3*a* which are closed so that a circuit is completed through unit I down dwell timer relay 1TR1 having normally open contacts 1TR1*a* and normally open contacts 1TR1*b* which will close after a predetermined lapse of time following energizing of relay 1TR1.

When relay 1TR1 times out so that contacts 1TR1*b* close, a circuit is completed through unit I transfer vent relay 1CR4 closing contacts 1CR4*a*. Because the contacts 1CR4*a* are closed and the contacts 1CR3*b* are closed, a circuit is completed through unit I lower transfer forward solenoid D3A. Also, a circuit is completed through unit I transfer vent solenoid B1A. This allows fluid to flow into the transfer cylinders 84 for unit I so as to move the lower pusher rods 82 forward. Because 1LS4 is closed and the normally open contacts 1CR3*f* are closed a circuit is also completed through relay 1CR5 when 1CR3 is energized so that normally open contacts 1CR5*a* are closed and unit I transfer slow speed solenoid C2A is energized. This provides for the movement of the pusher rods 82 in a forward direction at a slow rate of speed because it opens a by-pass line in the fluid supply line to the pusher cylinders thereby decreasing the supply of fluid thereto. As soon as the rods 82 have been moved to positions in which the cam 411 moves off the switch 1LS4, it opens automatically, deenergizing relay 1CR5 and opening contacts 1CR5*a* so as to deenergize solenoid C2A, thereby providing for closing of the bypass line 558 associated with the supply of fluid to the cylinders 84 so that additional oil is supplied to the cylinders to move them in a forward direction at a faster rate of speed.

Concurrently with the energizing of relay 1CR2 previously described, the unit I shuttle directional relay CR2 is energized because a circuit is completed through the leads 470 and 471 and the normally closed contacts 2LU1*a* and CR3*a*.

Energizing of relay CR2 provides for closing of contacts CR2*b* so that the solenoids JJ1A and JJ2A are energized to provide for driving the motors 222 in a direction to move the carts 200 toward their station No. 1 positions. Because the switches 1LS9, 2LS9, 1LS10 and 2LS10 are all closed, the motors 222 are driven at high speed. When the cams 430 and 437 on the carts open the switches 1LS10 and 2LS10 the previously energized relays 1CR12 and 2CR12 are deenergized opening contacts 1CR12*a* and 2CR12*a* deenergizing solenoids HH1A and HH2A and providing for a reduction in speed of carts 200. When the carts arrive in station No. 1 positions, the arm 431 on the cart 200L closes the switch 1LS8 and the corresponding arm 436 on cart 200R closes the switch 2LS8. Consequently, the relays 1CR14 and 2CR14 are energized, for a purpose to appear presently. The carts are held in station No. 1 until relay 2LU1 is energized in response to a full forward movement of the upper pushers.

At this time, therefore, the chassis 48 is down, the pusher rods 82 are moving forwardly at their high rate of speed, and the carts 200L and 200R are in their station No. 1 positions.

When the unit I transfer pusher rods 82 are all the way forward, the arm 410 closes both sets of contacts in switch 1LS3 thereby energizing unit I down transfer repeater relay 1CR6 and unit I transfer interlock relay 1CR7. In addition, unit I lift cycle relay 1LU1 has its energizing winding 1LU1E energized through the closed contacts 1CR3*c* and 1CR6*a*. Energizing of winding 1LU1E causes opening of the contacts 1LU1*a* so that relay 1CR2 is deenergized and in turn unit I down solenoid E1B is deenergized. Consequently, the bleed valve E1 for the lift cylinder 458 is moved to a position shutting off communication of line 524 with tank 503 preparatory to flow of fluid into the lift cylinders for lifting the chassis 48. Unit I up relay 1CR8 is energized through normally closed switch 1LS2A, the closed normally open contacts 1CR7*b* and 1LU1*b* and the normally closed contacts 2CR8*a*. Unit I up cushion relay 1CR9 is also energized, in response to energizing of winding 1LU1E, through the switch 1LS2A, the contacts 1LU1*c* and the normally closed contacts for unit I up limit switch 1LS2B which is also in circuit with the normally closed contacts 2CR8*b*.

When solenoid 1CR8 was energized, contacts 1CR8*c* were closed so that unit I lift selector solenoid NB was energized along with unit I lift solenoid E1A. Unit I cushion solenoid D3B was also energized through the contacts 1CR9*a* which closed when the solenoid 1CR9 was energized. At this time, fluid is supplied to the lift cylinder 458 and the chassis 48 begins its upward movement.

Simultaneously with the energizing of the unit I down relay 1CR2, previously described, a circuit was completed through unit II down solenoid 2CR2 through the normally closed contacts 2CR7*a* and 2LU1*a*. Likewise, the energizing winding 2LU2E for the unit II down safety interlock relay 2LU2 was energized through unit II down limit switch 2LS1*b* and the contacts 2CR2*a*. Energizing of winding 2LU2E causes closing of contacts 2LU2*a*, and energizing of unit II down repeater relay 2CR3 having normally open contacts 2CR3*a* which are closed, energizing unit II down dwell timer 2TR1. This causes closing of contacts 2TR1*a* and when the relay 2TR1 times out and closes contacts 2TR1*b*, relay 2CR4 is energized.

Unit II up and down forward transfer speed control relay 2CR5 is energized through closed switch 2LS4 and contacts 2CR3*b* which were closed when relay 2CR3 was energized. Energizing of the relays 2CR4 and 2CR5 causes closing of the contacts 2CR4*a* and 2CR5*a* resulting in energizing unit II lower transfer forward solenoid D1A through closed contacts 2CR3*c* and unit II transfer vent solenoid B2A. Energizing of the solenoids D1A and B2A provides for a flow of fluid into the unit II transfer mechanism 166 to provide for a forward movement of the lower pusher rods in the mechanism 166. This movement is at a slow speed because the unit II transfer slow speed solenoid C1A is closed allowing some of the fluid entering the cylinders to bleed off. When the lower pusher rods have moved forwardly far enough to move the cam 414 out of engagement with the operating arm for switch 2LS4, switch 2LS4 opens and relay 2CR5 is deenergized, opening the contacts 2CR5*a* and deenergizing the solenoid C1A so that this bleed off of fluid is stopped and the forward movement of the lower pushers in unit II proceeds at a slower speed. When the unit II lower pusher rods are all the way forward, the arm 412 closes the two pairs of contacts in the switch 2LS3 energizing the relays 2CR6 and 2CR7. When the relay 2CR7 is energized the normally closed contacts 2CR7*a* are opened so that the unit II down relay 2CR2 is deenergized preparatory to lifting the unit II chassis 154.

It can thus be seen that while the shuttle carts 200L and 200R are in their station No. 1 positions, the lower pusher mechanism 80 for unit I has completed its forward movement, and unit I chassis 48 is moved upwardly, the lower pusher mechanism 166 for unit II has completed its forward movement and the circuit which provides for movement of the chassis 154 upwardly has been prepared.

When the chassis 48 has risen to a position in which the arm 402 has been moved out of a position closing the switch 1LS1B, this switch opens so that relay 1CR3 is deenergized. The normally closed down safety limit switch 1LS1A which was held open by the cam 401 on the chassis 48 in its down position is also released so that it closes. When the switch 1LS1B opened, the energizing winding 1LU2E for the safety interlock relay 1LU2 was deenergized and when switch 1LS1A was closed, the releasing winding 1LU2R for relay 1LU2 was energized, thereby unlatching the relay 1LU2 and opening the contacts 1LU2*a*. When unit I down repeater relay 1CR3 is deenergized, the contacts 1CR3*d*, which are in series with the energizing winding 2LU1E for the relay 2LU1 are closed and the winding 2LU1E is energized because the contacts 2CR6*a* and 2CR3*d* were previously closed. As will later be described in detail, at this time the shuttle carts 200 are movable toward their station No. 2 positions.

Deenergizing of relay 1CR3 also causes deenergizing of solenoid D3A, which is the lower transfer forward solenoid and energizes unit I lower transfer return solenoid D3B through the closed contacts 1CR3*e* and 1CR6*b*, thereby reversing the flow of fluid to unit I transfer cylinder assemblies 84 so that the transfer rods 82 are retracted. When the rods 82 have been fully retracted, the arm 409 carried thereby opens 1LS3 thereby deenergizing the relays 1CR6 and 1CR7. It is to be noted, however, that the contacts 1CR7*b* which have been closed while the relay 1CR7 was energized, have been maintaining the relay 1CR4 in an energized condition after deenergizing of the relay 1TR1 in response to opening of the contacts 1CR3*a*. The contacts 1CR4*a* have been maintaining the vent solenoid B1A and return solenoid D3B energized for return of the transfer pushers when unit I chassis 48 is lifting. When relay 1CR7 is deenergized, the relay 1CR4 is likewise deenergized so that the lower transfer return solenoid D3B and the vent solenoid B1A are likewise deenergized.

When unit I chassis 48 has moved upwardly to a position in which the cam 403 thereon opens the switch 1LS2A, which is normally closed, the up cushion relay 1CR9 is deenergized, opening the contacts 1CR9*a* and deenergizing the unit I cushion solenoid D'3B. Note that the contacts 1CR1*b* are open at this time because relay 1CR1 is deenergized because the normally closed contacts 1LU1*f* are open as a result of the energizing of the winding 1LU1E. The amount of fluid flowing into the lift cylinder 458 is decreased in response to deenergizing of the solenoid D'3B, thereby causing a cushioning effect on the upward movement of the chassis so that it continues upward at a slower rate of speed. When the chassis 48 has been moved to its top position, the arm 404 thereon operates the switch 1LS2B so that the normally closed set of contacts are opened and the normally open set of contacts are closed, thereby completing a circuit through the relay 1CR10 through the contacts 1CR14*b* and 2CR14*b*.

The contacts 1CR14*b* and 2CR14*b* are closed only if their relays 1CR14 and 2CR14, respectively, are energized in response to closing of the switches 1LS8 and 2LS8 in response to movement of the shuttle carts 200L and 200R into their station No. 1 positions. This is to prevent operation of the upper pusher rods 94 until the shuttle carts 200 have been properly positioned at the ends of unit I.

When the relay 1CR10 is energized, contacts 1CR10*a* are closed so that the transfer vent relay 1CR4 is again energized, thereby energizing the transfer vent solenoid B1A and, because the contacts 1CR10*b* are closed, unit I upper transfer forward solenoid D4A is energized. Energizing of the relay 1CR10 also closes the contacts 1CR10*c* which are in series with the switch 1LS6 which is closed by the cam 417 in the returned position of the upper pusher rods 94 so that the speed control relay 1CR5 is again energized closing the contacts 1CR5*a* and energizing the slow speed solenoid C2A. Consequently, at this time fluid under pressure is applied to the upper cylinders 106 with a portion of this fluid being bled off so that the forward movement of the pusher rods 94 is at a slow speed. When the pusher rods have been moved forwardly to a position in which the cam 417 has been moved to a position releasing the switch 1LS6, relay 1CR5 is deenergized, thereby deenergizing slow speed solenoid C2A so that no more fluid is bled off and the speed of the pusher rods 94 is increased.

When the upper pusher rods 94 have been moved all the way forward, the arm 416 operates the switch 1LS5 closing both normally open sets of contacts therefor. Closing of one set of contacts provides for energizing of the relay 1CR7 and closing of the other set of contacts provides for the energizing of the relay 1CR11. When relay 1CR11 is energized, since both the contacts 1CR11*a* and 1CR10*d* are closed, the releasing winding 1LU1R for the lock-up relay 1LU1 is energized so that all of the normally open sets of contacts operated by the relay are opened and the normally closed contacts are closed. Energizing of relay 1CR7 provides for deenergizing of the unit I up relay 1CR8 because the normally closed contacts 1CR7*c* are opened and the switch 1LS2A has been opened in response to upward movement of the chassis 48. Deenergizing of relay 1CR8 opens contacts 1CR8*c*, thereby deenergizing the lift selector solenoid NB and the lift solenoid E1A and preparing the circuit for downward movement of the chassis 48. Closing of contacts 1CR7*d* in response to energizing of the relay 1CR7 maintains relay 1CR4 energized in preparation for the return of the upper transfer pusher rods 94.

Deenergizing of relay 1LU1 provides for the return of the contacts 1LU1*f* to their normally closed positions thereby energizing unit I down cushion relay 1CR1 because the switch 1LS1A returned to its normally closed position when the chassis 48 was raised. Energizing of relay 1CR1 results in closing of the contacts 1CR1*a* and energizing of the relay 1CR2 with consequent closing of the contacts 1CR2*a* and energizing of the unit I down solenoid E1B so that fluid can flow out of the cylinder 458 to provide for downward travel of the chassis 48. Closing of the contacts 1CR1*b*, as a result of energizing of the relay 1CR1, causes energizing of the unit I cushion solenoid D'3B.

At this time, therefore, the upper transfer of carriers in unit I has been completed and the chassis 48 is moving downwardly with the carts 200L and 200R in their station No. 1 positions.

Unit II up relay 2CR8 is energized through normally closed up safety limit switch 2LS2A, the contacts 2CR7*d*, the contacts 2LU1*f*, and the contacts 1CR8*a*, which were closed when the relay 1CR8 was deenergized in response to closing of switch 1LS5 on full forward movement of upper pusher rods 94. Energizing of relay 2CR8 causes closing of the contacts 2CR8*e* and energizing of the unit II lift selector solenoid NA and lift solenoid E2A. Unit II up cushion relay 2CR9 is energized through the switch 2LS2A and 2LU1*e* contacts, the normally closed contacts for the unit II up limit switch 2LS2B and the normally closed contacts 1CR8*b*. Energizing of the relay 2CR9 results in closing of the contacts 2CR9*a* with consequent energizing of the unit II up cushion solenoid D'2B.

Fluid is thus directed to the unit II lift cylinders 460 so that the chassis 154 is raised concurrently with downward travel of the chassis 48. As unit II chassis 154 rises releasing down limit switch 2LS1B to its normal open position repeater relay 2CR3 is deenergized opening contacts 2CR3*c* and thereby deenergizing lower transfer forward solenoid D1A. Normally closed contacts 2CR3*c* are closed and contacts 2CR6*c* are closed because switch 2LS3 is closed. These contacts provide for energizing of unit II lower transfer return solenoid D1B so that the flow of fluid to the unit II transfer cylinders 166 is such that the pusher rods 84 are retracted. When they are fully retracted switch 2LS3 is opened thereby deenergizing relays 2CR6, 2CR7 and 2CR4.

When unit II lift cycle relay 2LU1 was energized in response to full forward movement of the unit I upper pushers, thereby opening the contacts 2LU1*a*, shuttle relay CR2 was deenergized opening contacts CR2*b* and deenergizing solenoids JJ1A and JJ2A which position the carts 200L and 200R, respectively, in station No. 1. When relay CR2 is deenergized, contacts CR2*e* are closed. Consequently, a circuit is completed through the closed contacts 2LU1*d* and CR2*e* to energize the relay CR3 thereby closing contacts CR3*a* and energizing solenoids JJ1B and JJ2B which control movement of the carts so that they move toward station No. 2. As the carts 200L and 200R leave their respective No. 1 stations, the position limit switches 1LS8 and 2LS8 are released so that they move to their normal open positions deenergizing the relays 1CR14 and 2CR14.

Furthermore, until the cams 430 and 437 release the switches 1LS10 and 2LS10 to their normal closed positions the solenoids HH1A and HH2A remain deenergized so that movement of the carts is at a slow speed. As the carts approach station No. 2 the cams 432 and 438 open the switches 1LS9 and 2LS9 so that the contacts 1CR12*a* and 2CR12*a* are closed so that solenoids HH1A and HH2A are again energized and the final movement of the carts into station No. 2 positions is at a slow speed.

As chassis 48 moves downwardly it releases unit I up limit switch 1LS2B so that the switch contacts in series with relay 1CR10 move to their normally open position and deenergize the relay 1CR10, opening the contacts 1CR10*b* and deenergizing the upper transfer forward solenoid D4A. Furthermore, since the contacts 1CR11*c* are closed because 1LS5 is closed until the upper pushers are fully retracted, and the contacts 1CR10*e* are closed in response to deenergizing of the relay 1CR10, the unit I upper transfer return solenoid D4B is energized. Consequently, the flow of fluid to the upper transfer cylinders 106 is such that the upper transfer rods 94 are retracted.

It can thus be seen that at this time the chassis 48 is moving downwardly and the upper pushers for unit I are being retracted, the chassis 154 is moving upwardly, the lower pushers for unit II are being retracted, and the carts 200 are moving toward station No. 2 positions.

When the upper transfer pusher rods 94 for unit I have been fully returned, the arm 415 operates switch 1LS5 so as to open both sets of contacts thereby deenergizing the relays 1CR7 and 1CR11. Deenergizing of relay 1CR7 causes opening of contacts 1CR7*b* thereby deenergizing relay 1CR4 and opening contacts 1CR4*a* thereby deenergizing upper transfer return solenoid D4B and vent solenoid B1A.

Unit I chassis 48 moves downwardly until cam 401 operates switch 1LS1A and moves it to an open position thereby deenergizing down cushion relay 1CR1 and opening contacts 1CR1*b* to thereby deenergize unit I cushion solenoid D'3B. When this solenoid is deenergized, the amount of fluid allowed to flow out of the unit I lift cylinder 458 is decreased thereby causing a cushioning effect on the lowering movement of the chassis. Therefore, chassis 48 will continue its downward movement at a slower rate of speed. When it reaches its full down position, the arm 402 closes the switch 1LS1B and unit I will repeat the cycle heretofore described. When the unit I starts its cycle of operation it will continue until the lower pushers have been moved forward in the down position of the chassis. Further cycling of unit I awaits further signal from unit II, namely, deenergizing of relay 2CR8 which must occur before relay 1CR8 can be energized.

As unit II chassis 154 rises, the cam 407 carried thereby opens the normally closed switch 2LS2A thereby deenergizing relay 2CR9 and opening contacts 2CR9*a*, thereby deenergizing unit II cushion solenoid D'2B and providing for a decreased flow of fluid into the lift cylinders 460 thereby creating a cushioning effect on the upward movement thereof.

Unit II chassis 154 will continue the remainder of its upward movement at a slower rate of speed. When it has been moved to its full up position, the arm 403 carried by the chassis operates the switch 2LS2B, opening the normally closed set of contacts and closing the normally open set of contacts therefor, thereby energizing relay 2CR10 through the contacts 1CR13*a* and 2CR13*a* which are closed because the relays 2CR13 and 1CR13 are energized as a result of closing of the switches 1LS7 and 2LS7 by the carts 200 when they reach their station No. 2 positions. Thus, before any transfer of work carriers 42 can be commenced in unit II, the shuttle carts 200 must be in their station No. 2 positions.

When relay 2CR10 is energized, its contacts 2CR10*a* are closed, thus energizing relay 2CR4 and again closing the contacts 2CR4*a* to provide for energizing of the unit II transfer vent solenoid B2A and upper transfer forward solenoid D2A through the contacts 2CR10*b*. In response to energizing of these solenoids, fluid is supplied to the upper transfer cylinders 172 so that the upper pushers 170 begin their forward movement. This movement is at a slow speed because simultaneously with energizing of the solenoids B2A and D2A, the unit II transfer slow speed solenoid C1A is energized in response to closing of the contacts 2CR5*a* on energizing of the relay 2CR5. This relay was energized by closing of the contacts 2CR10*c* when the relay 2CR10 was energized. The switch 2LS6 is held closed by the cam 422 during initial forward movement of the pusher rods 170. When the forward movement of the pusher rods 170 has progressed to a point at which the cam 422 releases the switch 2LS6, the slow speed solenoid C1A is deenergized thereby allowing more fluid to flow into the upper transfer cylinders 106 with a consequent increase in the speed of travel thereof.

When the unit II upper pushers have been moved to the full forward positions, the arm 420 operates the switch 2LS5 so that both sets of contacts therefor are closed thereby energizing the relays 2CR7 and 2CR11. Energizing of the relay 2CR7 causes closing of the contacts 2CR7*b* to maintain the relay 2CR4 energized to provide for return of the transfer pushers 170 as unit II moves downwardly. Unit II up transfer repeater relay 2CR11, when energized, closes the contacts 2CR11*a* which are in series with contacts 2CR10*e* to provide for energizing of the release winding 2LU1R for the relay 2LU1 to thereby deenergize the relay.

When relay 2CR7 was energized on closing of switch 2LS5, relay 2CR8 is deenergized because the normally closed contacts 2CR7*c* are opened and the normally closed switch 2LS2A is held open by the cam 407. When relay 2CR8 is deenergized, contacts 2CR8*e* are opened so that the lift selector solenoid NA and the lift solenoid E2A are deenergized. Because winding 2LU1R has been energized, the normally closed contacts 2LU1*c* are closed thereby energizing unit II down cushion relay 2CR1 which is in series with the switch 2LS1A which is the unit II down safety limit and is normally closed and held open only when the chassis 154 is in a down position. Energizing of relay 2CR1 causes closing of the contacts 2CR1*a* which are in series with relay 2CR2 thereby causing energizing the relay 2CR2 and closing of the contacts 2CR2*a* to energize the unit II down solenoid E2B. Energizing of the relay 2CR1 also causes closing of the contacts 2CR1*c* and energizing of the unit II cushion solenoid D'2B. Energizing of these solenoids provides for a flow of fluid out of the chassis lift cylinders 460 so that the chassis 154 starts to lower.

Concurrently, with the deenergizing of the relay 2CR8 described above for providing for downward movement of the chassis 154, unit I up relay 1CR8 is energized by closing of the contacts 2CR8*a*. Unit I up cushion relay 1CR9 is also energized by closing of the contacts 2CR8*b* at this time. Consequently, unit I chassis 48 begins to move upwardly at this time concurrently with downward movement of chassis 154. Because the unit II upper pushers have completed their forward movement and relay 2LU1 has been deenergized closing contacts 2LU1*a*, the carts 200 move to station No. 1 positions concurrently with upward movement of chassis 48.

As chassis 154 moves downwardly, it releases unit II up limit switch 2LSB so that the normally open set of contacts for this switch move to an opened position deenergizing relay 2CR10. The other pair of contacts which are normally closed do not have any effect on relay 2CR9 because the contacts 1CR8*b* are open. On deenergizing of relay 2CR10, the contacts 2CR10*b* open so that solenoid D2A which provides for forward movement of the upper pusher rods 170 is deenergized and unit II upper transfer return solenoid D2B is energized through the normally closed contacts 2CR10*c* and the contacts 2CR11*c* which were closed when the switch 2LS5 was closed.

The upper pusher rods 170 then retract and when fully retracted the arm 421 on one of the rods opens switch 2LS5 so that relays 2CR7 and 2CR11 are deenergized. The contacts 2CR7*b* are thus opened so that relay 2CR4 is also deenergized opening the contacts 2CR4*a* and deenergizing the unit II transfer vent solenoid and the unit II upper transfer return solenoid D2B.

When the chassis 154 has moved downward to a position near its bottom limit the cam 405 thereon opens down safety limit switch 2LS1A thereby deenergizing down cushion relay 2CR1 and opening the contacts 2CR1*c*. This provides for a deenergizing of cushion solenoid D'2B with a resultant restriction to the flow of oil from the lift cylinders 460 so that the remainder of the downward travel of chassis 154 will be at a slower speed. When the chassis 154 has been fully lowered, the arm 406 thereon will open down limit switch 2LS1B. Unit II is then in condition to repeat the cycle described above coordinated with the cycle of unit I.

The up and down safety limit switches 2LS2A, 1LS2A, 2LS1A and 1LS1A prevent full up and down movement of the chassis 154 and 48 until the last operated upper or lower pusher mechanism has been fully returned. For example, when chassis 154 is moving downwardly, if down safety limit switch 2LS1A is opened deenergizing relay 2CR1 which opens contacts 2CR1*a* thereby deenergizing unit II down relay 2CR2 before the upper pushers 170 have returned opening switch 2LS5 and providing for closing of contacts 2CR7*a* to keep relay 2CR2 energized, the downward movement of the chassis will be terminated until the upper pushers are fully retracted to open 2LS5. The "up" safety limit switch 2LS2A operates similarly with the lower pusher return switch 2LS3 to control unit II "up" relay 2CR8.

From the above description, it is seen that this invention provides a versatile work handling machine 10 which is operable to perform a large variety of work handling sequences. The flexibility of the machine 10 for different work handling operations is obtained by changing the location of the station selector mechanisms on the machine frame and the selector structure on the carriers 42. Furthermore, each sequence for any carrier is determined by the structure of that carrier at the time it is introduced into the machine 10. Consequently, complete control can be exercised over any part to be handled merely by selecting the carrier on which that part will travel through the machine 10. The pusher assemblies for advancing and retracting the lower pusher dogs 80, which must be moved upwardly to be in positions engageable with carriers on the lower tracks 50 on forward movement of the pusher rods and must be moved downwardly in order to pass below the carriers on the tracks 50 on a return movement of the pusher rods, are constructed so that the required up and down movement of the dogs at the desired times is insured.

It will be understood that the specific construction of improved work handling apparatus which is herein disclosed and described is presented for purposes of explanation and illustration only and is not intended to indicate limtis of the invention, the scope of which is defined by the following claims.

What is claimed is:

1. In a machine having a plurality of liquid treatment tanks arranged in a longitudinally extending row and adapted to receive work carried on work carriers, a main frame extending above said tanks and a chassis mounted on the main frame for up and down movement between a lower position and an upper position, lower continuous track means on the frame above said tanks at a position in which work suspended from a carrier supported on the track means is received in a tank, a plurality of aligned first track sections arranged above said track means at a level such that the work suspended on said carriers is positioned above said tanks when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction.

2. In a machine having a plurality of liquid treatment tanks arranged in a longitudinally extending row and adapted to receive work carried on work carriers of a type having a pair of horizontally spaced supporting fingers at opposite ends thereof, a main frame extending above said tanks and a chassis mounted on the main frame for up and down reciprocal movement between a lower position and an upper position, lower continuous track means on the frame above said tanks at a position in which work suspended from a carrier supported on the track means is received in a tank, a plurality of aligned first track sections arranged above said track means at a level such that the work suspended on said carriers is positioned above said tanks when the carriers are supported on said first track sections, some of said upper track sections being arranged in pairs with the sections in each pair being spaced apart a distance corresponding to the distance each pair of fingers is spaced apart, a plurality of aligned second track sections supported on said chassis for raising and lowering a work carrier position thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction.

3. In a work handling machine, stationary continuous lower track means, stationary upper track sections arranged in longitudinally extending rows with the adjacent sections in each row being spaced a predetermined distance apart, and vertically movable means for transferring carriers from said upper track sections to said lower track means and vice versa; a carrier comprising a horizontal beam having pairs of horizontally spaced supporting fingers at the ends thereof, each pair of fingers being spaced apart a distance greater than the length of some of said upper track sections and a distance corresponding substantially to said predetermined distance, and each of said fingers being of a size to be movable vertically through the space between adjacent upper track sections.

4. In a work handling machine, stationary continous lower track means, stationary upper track sections arranged in longitudinally extending rows with adjacent sections in each row being spaced a predetermined distance apart, and vertically movable means for transferring carriers from said upper track sections to said lower track means and vice versa; a carrier comprising a continuous horizontal beam having pairs of flat horizontally spaced supporting fingers extending outwardly from opposite ends thereof, each pair of fingers being spaced apart a distance corresponding substantially to said predetermined distance and a distance greater than the length of some of said sections, and each of said fingers being of a size to be movable vertically through the space between adjacent track sections.

5. In a machine having a plurality of liquid treatment tanks arranged in a longitudinally extending row and adapted to receive work carried on work carriers, a main frame extending above said tanks and a chassis mounted on the main frame for up and down reciprocal movement between a lower position and an upper position, lower continuous track means on the frame above said tanks at a position in which work suspended from a carrier supported on the track means is received in a tank, a plurality of aligned first track sections arranged above said tracks at a level such that the work suspended on said carriers is positioned above said tanks when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction, a work carrier of a length to be slidably supported at its ends on said upper and lower track means, selector means on said main frame above said tanks, an actuator for said selector means, and means on said carrier providing for an adjustable support of said actuator thereon, said actuator being operable on engagement with said selector means to actuate the selector means to determine the location along said row at which said carrier will be transferred to said chassis for downward travel therewith.

6. In a machine having a plurality of liquid treatment tanks arranged in a longitudinally extending row and adapted to receive work carried on work carriers, a main frame extending above said tanks and a chassis mounted on the main frame for up and down reciprocal movement between a lower position and an upper position, lower continuous track means on the frame above said tanks at a position in which work suspended from a carrier supported on the track means is received in a tank, a plurality of aligned first track sections arranged above said tracks at a level such that the work suspended on said carriers is positioned above said tanks when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction, a work carrier of a length to be slidably supported at its ends on said upper and lower track means, and adjustable means on said carrier arranged for coaction with said second transfer means to determine a location along said row at which said carrier will move downwardly with said chassis, the adjustment of said carrier means determining said location.

7. In a machine having a plurality of liquid treatment tanks arranged in a longitudinally extending row and adapted to receive work carried on work carriers, a main frame extending above said tanks and a chassis mounted on the main frame for up and down reciprocal movement between a lower position and an upper position, lower continuous track means on the frame above said tanks at a position in which work suspended from a carrier supported on the track means is received in a tank, a plurality of aligned first track sections arranged above said tracks at a level such that the work suspended on said carriers is positioned above said tanks when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction, and means for actuating both said first and second transfer means in the upper position of the chassis and only said first transfer means in the lower position of the chassis.

8. In a machine having a plurality of liquid treatment tanks arranged in a longitudinally extending row and adapted to receive work carried on work carriers, a main frame extending above said tanks and a chassis mounted on the main frame for up and down reciprocal movement between a lower position and an upper position, lower continuous track means on the frame above said tanks at a position in which work suspended from a carrier supported on the track means is received in a tank, a plurality of aligned first track sections arranged above said tracks at a level such that the work suspended on said carriers is positioned above said tanks when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction, a work carrier of a length to be slidably supported at its ends on said upper and lower track means, means adjustably mounted on said carrier and extending downwardly therefrom for engagement by said first transfer means for advancing said carrier on said lower track means, the adjusted position of said downwardly extending means determining a location along said row at which said carrier is movable to a position above some of said chassis track sections for support thereon when said chassis moves upwardly.

9. In a work handling machine, a main frame and a chassis mounted on the main frame for up and down movement between a lower position and an upper position, lower continuous track means on the frame, a plurality of aligned first track sections arranged above said track means, a plurality of aligned second track sections supported on said chassis for raising and lowering a work carrier positioned thereon to and from a lowered position on said continuous track means and a raised position in alignment with said first track sections, said second track sections positioned below the level of said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction, a work carrier of a length to be slidably supported at its ends on both said upper and said lower track means, and coacting adjustable means on said carrier and said first transfer means for determining the location on said chassis at which said carrier will be moved upwardly with said chassis.

10. In a machine having a plurality of liquid treatment tanks arranged in a longitudinally extending row and adapted to receive work carried on work carriers, a main frame extending above said tanks and a chassis mounted on the main frame for up and down reciprocal movement between a lower position and an upper position, lower continuous track means on the frame above said tanks at a position in which work suspended from a carrier supported on the track means is received in a tank, a plurality of aligned first track sections arranged above said tracks at a level such that the work suspended on said carriers is positioned above said tanks when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, and second carrier transfer means on the frame adjacent said upper track means for moving carriers thereon in said one direction, selector means operatively associated with a multiple cell tank in said row, and means on said carrier adapted to be set in an adjusted position when said carrier is deposited on said machine and operable to actuate said selector means to determine at which of said cells said carrier moves downwardly with said chassis and operable to coact with said first transfer means to determine at which of said cells said carrier will move upwardly with said chassis.

11. In a machine having a plurality of liquid treatment tanks arranged in a longitudinally extending row and adapted to receive work carried on work carriers, a main frame extending above said tanks and a chassis mounted on the main frame for up and down reciprocal movement between a lower position and an upper position, lower continuous track means on the frame above said tanks at a position in which work suspended from a carrier supported on the track means is received in a tank, a plurality of aligned first track sections arranged above said tracks at a level such that the work suspended on said carriers is positioned above said tanks when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, first carrier transfer means on the frame adjacent said lower track means for moving carriers thereon in one direction, said transfer means comprising a longitudinally movable transfer rod and upstanding pusher dogs mounted on longitudinally spaced portions of said rod, a work carrier adapted to be slidably mounted on said track means, depending legs adjustably mounted on said carrier for engagement by some of said dogs, the adjusted mounting of said legs determining which of said dogs engage said legs, and second carrier transfer means on the frame adjacent said upper track means for moving carriers thereon in said one direction.

12. In a machine having a plurality of liquid treatment tanks arranged in a longitudinally extending row and adapted to receive work carried on work carriers, and track means extending longitudinally of said tanks for supporting said carriers; means for advancing said carriers in one direction along said track means, said advancing means comprising a pusher rod substantially parallel to said row, means for reciprocating said rod, a bar parallel to and above said pusher rod, pusher dogs mounted on longitudinally spaced portions of said bar, parallel links pivotally connected to and extending between said rod and said bar, means for moving said links in directions for raising said bar on movement of said pusher rod in said one direction and for moving said bar downwardly on return movement of the pusher bar, said means for moving said links comprising reciprocable power means connected to pivot means operatively connected to said pusher rod and said links for raising said bar on reciprocation of said power means and said pusher rod in said one direction and for moving said bar downwardly on movement of said power means and said pusher rod in said return movement, and coacting means on said bar and said pusher rod for limiting the raising movement of said bar.

13. In a machine having a plurality of liquid treatment tanks arranged in a longitudinally extending row and adapted to receive work carried on work carriers, and track means extending longitudinally of said tanks for supporting said carriers; means for advancing said carriers in one direction along said track means, said advancing means comprising a pusher rod substantially parallel to said row, means for reciprocating said rod, a bar parallel to and above said pusher rod, pusher dogs mounted on longitudinally spaced portions of said bar, parallel links pivotally connected to and extending between said rod and said bar, means for moving said links in directions for raising said bar on movement of said pusher rod in said one direction and for moving said bar downwardly on return movement of the pusher bar, said means for moving the links comprising a hydraulic cylinder having a piston rod, means connecting said piston rod to said links so that on movement of the piston rod in said one direction the links are moved in said directions for raising said bar, and means on said bar engageable with said rod for limiting raising movement of the bar to a position in which said links are inclined.

14. In a machine having a plurality of liquid treatment tanks arranged in a longitudinally extending row and adapted to receive work carried on work carriers, a main frame located adjacent said tanks, and a pair of parallel tracks extending longitudinally of said tanks for supporting said carriers; means for advancing said carriers in one direction along said tracks, said advancing means comprising pusher rods corresponding to said tracks, bars corresponding to said pusher rods, each bar being parallel to and above the corresponding pusher rod, parallel links pivotally connected to and extending between each rod and its corresponding bar so that on swinging movement of said links in one direction the bar is moved upwardly, pusher dogs mounted on and extending upwardly from each bar, actuating means connected to one link on each bar operable to swing said link in said one direction, means including a shaft extending transversely of and between said rods providing for concurrent movement of said bars in response to movement of one bar, and motor means connected to one of said actuating means for moving said links and for moving said rods in said one direction.

15. In a machine having a plurality of liquid treatment tanks arranged in a longitudinally extending row and adapted to receive work carried on work carriers, a main frame located adjacent said tanks, and a pair of parallel tracks extending longitudinally of said tanks for supporting said carriers; means for advancing said carriers in one direction along said tracks, said advancing means comprising pusher rods parallel to and corresponding to said tracks, means for moving said rods in said one direction and return, bars coresponding to and positioned above and parallel to said rods, pusher dogs mounted on spaced portions of the bars, parallel link members connected to and extending between each rod and its corresponding bar, and means including roller members movable to positions between each rod and its corresponding bar for raising each bar relative to its corresponding rod on movement of the rod in said one direction.

16. In a machine having a plurality of liquid treatment tanks arranged in a longitudinally extending row and adapted to receive work carried on work carriers, a main frame located adjacent said tanks, and a pair of parallel tracks extending longitudinally of said tanks for supporting said carriers; means for advancing said carriers in one direction along said tracks, said advancing means comprising pusher rods parallel to and corresponding to said tracks, means for moving said rods in said one direction and return, bars corresponding to and positioned above and parallel to said rods, pusher dogs mounted on spaced portions of the bars, parallel link members connected to and extending between each rod and its corresponding bar, a plurality of horizontally spaced notches in each rod, each notch having an upwardly inclined side, a roller disposed in each notch, first stop means on said frame engageable with each roller on movement of said rods in said one direction for moving the rollers upwardly on said inclined notch sides to positions between said rods and bars for raising the bars and dogs, second stop means on the frame engageable with the rollers on movement of the rods in a reverse direction for moving the rollers into said notches to lower the bars with respect to the rods, motor means for moving one of said rods in said one direction and return and rack and gear means connected to and extending between rods to provide for concurrent movement thereof.

17. In a work handling machine, a main frame, a chassis mounted on the main frame for up and down movement between a lower position and an upper position, lower continuous track means on the frame, a plurality of aligned first track sections arranged above said track means at a level such that the work suspended on said carriers is positioned above said track means when the carriers are supported on said first track sections, a plurality of aligned second track sections supported on said chassis for raising and lowering a work carrier positioned thereon to and from a lowered position on said continuous track means and a raised position in alignment with said first track sections, said second track sections positioned below said continuous track means in the lower position of said chassis, said second track sections being arranged so that in the upper position of the chassis they extend between said first track sections so as to form therewith an upper continuous track means located above said lower track means, reciprocable first pusher members mounted on the frame adjacent said lower track means for engagement with carriers thereon to move said carriers in one direction, and reciprocatable second pusher members mounted on the frame adjacent said upper track means for engagement with carriers thereon to move said carriers in said one direction.

18. In a work handling machine, a pair of substantially horizontal continuous track members arranged in a spaced parallel relation, a chassis mounted for up and down movement between lower and upper positions, said chassis having track sections mounted thereon and arranged in substantially horizontal spaced rows which are parallel to said track members, said rows being spaced apart a distant such that they are movable to a position in which said track members are disposed between the rows of track sections, said chassis in the lower position thereof having said rows disposed below the level of said track members, work carriers having supporting fingers at the ends thereof resting on said track members and extending outwardly therefrom to positions above said rows in the lower position of said chassis, said rows having gaps between adjacent sections in each row of a size to provide for vertical travel of said fingers therethrough, whereby on movement of said chassis from said lower to said upper position the work carriers on said track members which have their fingers in vertical alignment with said gaps remain on said track members and the work carriers on the track members which have their fingers in vertical alignment with said track sections are engaged by said track sections and moved upwardly with said chassis, and variable advancing means for advancing said work carriers a preselected distance along said track members wherein said fingers thereon are selectively positioned in and out of alignment with said gaps in response to presettable selector means on said work carriers.

19. In a work handling machine, a pair of substantially horizontal continuous track members arranged in a spaced parallel relation, a chassis mounted for up and down movement between lower and upper positions, said chassis having track sections mounted thereon and arranged in substantially horizontal spaced rows which are parallel to said track members, said rows being spaced apart a distance such that they are movable to a position in which said track members are disposed between the rows of track sections, said chassis in the lower position thereof having said rows disposed below the level of said track members, work carriers having supporting fingers at the ends thereof resting on said track members and extending outwardly therefrom to positions above said rows in the lower position of said chassis, said rows having gaps between adjacent sections in each row of a size to provide for vertical travel of said fingers therethrough, whereby on movement of said chassis from said lower to said upper position the work carriers on said track members which have their fingers in vertical alignment with said gaps remain on said track members and the work carriers on the track members which have their fingers in vertical alignment with said track sections are engaged by said track sections and moved upwardly with said chassis, and pusher members mounted for reciprocatable movement into pushing engagement with vertically projecting portions at opposite ends of said carriers for moving the carriers in one direction on said track members, some of said pusher members being arranged so that they will contact some but not all of said projecting portions to thereby advance different ones of said carriers different distances to obtain a selection as to which carriers are raised with said chassis and which remain on said track members.

20. In a work handling machine, a pair of substantially horizontal continuous track members arranged in a spaced parallel relation, a chassis mounted for up and down movement between lower and upper positions, said chassis having track sections mounted thereon and arranged in substantially horizontal spaced rows which are parallel to said track members, said rows being spaced apart a distance such that they are movable to a position in which said track members are disposed between the rows of track sections, said chassis in the lower position thereof having said rows disposed below the level of said track members, work carriers having supporting fingers at the ends thereof resting on said track members and extending outwardly therefrom to positions above said rows in the lower position of said chassis, said rows having gaps between adjacent sections in each row of a size to provide for vertical travel of said fingers therethrough, whereby on movement of said chassis from said lower to said upper position the work carriers on said track members which have their fingers in vertical alignment with said gaps remain on said track members and the work carriers on the track members which have their fingers in vertical alignment with said track sections are engaged by said track sections and moved upwardly with said chassis, and pusher bars mounted for reciprocatable movement, pusher dogs on said bars movable into pushing engagement with vertically projecting portions at opposite ends of said carriers for moving the carriers in one direction on said track members, some of said pusher dogs being constructed with work faces which are offset in the direction of reciprocation of said pusher bars so that different projecting portions are engaged by different work faces to thereby advance different ones of said carriers different distances to obtain a selection as to which carriers are raised with said chassis and which remain on said track members.

21. In a work handling machine, a pair of substantially horizontal rows of first track sections arranged in a spaced parallel relation, a chassis mounted for up and down movement between upper and lower positions, said chassis having second track sections mounted thereon and arranged in substantially horizontal spaced rows which are parallel to said rows of first track sections, said rows of second track sections being spaced apart a distance corresponding to the spacing of said rows of first track sections, said first and second track sections being arranged so that in said upper position of the chassis the second track sections fit between said first track sections so that two parallel rows of end to end track sections are formed providing two continuous supporting surfaces, work carriers having supporting fingers at the ends thereof resting on said track sections and arranged so that in any one position of a carrier its fingers are adapted to be supported on either said first track sections or said second track sections whereby on movement of said chassis from said upper to said lower positions, the work carriers which have their fingers supported on said first track sections remain on said first track sections and the work carriers which have their fingers supported on said second track sections are moved downwardly with said chassis, and variable advancing means for advancing said work carriers a preselected distance along said first track sections and said second track sections when in said upper position for selectively positioning said fingers on said first track sections and said second track sections when in said upper position for selectively positioning said fingers on said first track sections and said second track sections in response to presettable selector means on said work carriers.

22. In a work handling machine, a pair of substantially horizontal rows of first track sections arranged in a spaced parallel relation, a chassis mounted for up and down movement between upper and lower positions, said chassis having second track sections mounted thereon and arranged in substantially horizontal spaced rows which are parallel to said rows of first track sections, said rows of second track sections being spaced apart a distance corresponding to the spacing of said rows of first track sections, said first and second track sections being arranged so that in said upper position of the chassis the second track sections fit between said first track sections so that two parallel rows of end to end track sections are formed providing two continuous supporting surfaces, work carriers having supporting fingers at the ends thereof resting on said track sections and arranged so that in any one position of a carrier its fingers are adapted to be supported on either said first track sections or said second track sections whereby on movement of said chassis from said upper to said lower positions, the work carriers which have their fingers supported on said first track sections remain on said first track sections and the work carriers which have their fingers supported on said second track sections are moved downwardly with said chassis, and pusher means mounted for movement a predetermined distance in one direction and engageable with said carriers for moving the carriers in said one direction, said pusher means being operable to move some of said carriers onto said first track sections and others onto said second track sections.

23. In a work handling machine a pair of substantially horizontal rows of first track sections arranged in a spaced parallel relation, a chassis mounted for up and down movement between upper and lower positions, said chassis having second track sections mounted thereon and arranged in substantially horizontal spaced rows which are parallel to said rows of first track sections, said rows of second track sections being spaced apart a distance corresponding to the spacing of said rows of first track sections, said first and second track sections being arranged so that in said upper position of the chassis the second track sections fit between said first track sections so that two parallel rows of end to end track sections are formed providing two continuous supporting surfaces, work carriers having supporting fingers at the ends thereof resting on said track sections and arranged so that in any one position of a carrier its fingers are adapted to be supported on either said first track sections or said second track sections whereby on movement of said chassis from said upper to said lower positions, the work carriers which have their fingers supported on said first track sections remain on said first track sections and the work carriers which have their fingers supported on said second track sections are moved downwardly with said chassis, and pusher means mounted for movement a predetermined distance in one direction and engageable with said carriers for moving the carriers in said one direction, said pusher means being operable to move some of said carriers onto said first track sections and others onto said second track sections, said pusher means comprising pairs of dog members, with the dogs in each pair including a short dog and a long dog mounted so that a carrier engaged by said long dog is moved onto said second sections and a carrier engaged by said short dog is moved onto said first sections.

24. In a work handling machine, a pair of substantially horizontal rows of first track sections arranged in a spaced parallel relation, a chassis mounted for up and down movement between upper and lower positions, said chassis having second track sections mounted thereon and arranged in substantially horizontal spaced rows which are parallel to said rows of first track sections, said rows of second track sections being spaced apart a distance corresponding to the spacing of said rows of first track sections, said first and second track sections being arranged so that in said upper position of the chassis the second track sections fit between said first track sections so that two parallel rows of end to end track sections are formed providing two continuous supporting surfaces, work carriers having supporting fingers at the ends thereof resting on said track sections and arranged so that in any one position of a carrier its fingers are adapted to be supported on either said first track sections or said second track sections whereby on movement of said chassis from said upper to said lower positions, the work carriers which have their fingers supported on said first track sections remain on said first track sections and the work carriers which have their fingers supported on said second track sections are moved downwardly with said chassis, a pair of substantially horizontal continuous track members arranged in a spaced parallel relation below said first track sections, said rows of second track sections being spaced apart a distance such that they are movable to a position in which said track members are disposed between the rows of second track sections, said chassis in the lower position thereof having said rows disposed below the level of said track members, said work carriers having supporting fingers at the ends thereof movable to positions resting on said track members and extending outwardly therefrom to positions above said rows of second track sections in the lower position of said chassis, said rows having gaps between adjacent sections in each row of a size to provide for vertical travel of said fingers therethrough, whereby on movement of said chassis from said lower to said upper position the work carriers on said track members which have their fingers in vertical alignment with said gaps remain on said track members and the work carriers on the track members which have their fingers in vertical alignment with said second track sections are engaged thereby and moved upwardly with said chassis.

References Cited in the file of this patent

UNITED STATES PATENTS

| | | |
|---|---|---|
| 1,604,505 | Valerius | Oct. 26, 1926 |
| 1,624,026 | Utz | Apr. 12, 1927 |
| 1,996,031 | Potthoff | Mar. 26, 1935 |
| 2,098,526 | Stegemann | Nov. 9, 1937 |
| 2,602,558 | Clark | July 8, 1952 |
| 2,650,600 | Davis | Sept. 1, 1953 |
| 2,733,805 | Lyman | Feb. 7, 1956 |
| 2,738,888 | Todd | Mar. 20, 1956 |
| 2,780,229 | Davis | Feb. 5, 1957 |
| 2,851,044 | Davis | Sept. 9, 1958 |
| 2,854,159 | Abbey | Sept. 30, 1958 |
| 2,894,517 | Davis | July 14, 1959 |